(12) United States Patent
Cai

(10) Patent No.: US 11,563,459 B2
(45) Date of Patent: Jan. 24, 2023

(54) INTEGRATED STRUCTURE OF SHELL AND FILM WITH HIGH COMPATIBILITY AND CONVENIENT POSITIONING

(71) Applicant: Xudong Cai, Guangdong (CN)

(72) Inventor: Xudong Cai, Guangdong (CN)

(*) Notice: Subject to any disclaimer, the term of this patent is extended or adjusted under 35 U.S.C. 154(b) by 0 days.

(21) Appl. No.: 17/847,267

(22) Filed: Jun. 23, 2022

(65) Prior Publication Data

US 2022/0416831 A1   Dec. 29, 2022

Related U.S. Application Data

(63) Continuation-in-part of application No. 17/377,423, filed on Jul. 16, 2021, now abandoned.

(30) Foreign Application Priority Data

Jun. 26, 2021 (CN) .......................... 202121436055.9
Jun. 26, 2021 (CN) .......................... 202121439716.3

(51) Int. Cl.
   *H04B 1/3888* (2015.01)
   *A45C 11/00* (2006.01)

(52) U.S. Cl.
   CPC ............ *H04B 1/3888* (2013.01); *A45C 11/00* (2013.01); *A45C 2011/002* (2013.01)

(58) Field of Classification Search
   CPC .. H04B 1/3888; A45C 11/00; A45C 2011/002
   See application file for complete search history.

(56) References Cited

U.S. PATENT DOCUMENTS

| 10,708,403 | B2* | 7/2020 | Mody | .................. B32B 3/08 |
| 2014/0036420 | A1* | 2/2014 | Chen | .................. A45C 11/00 |
| | | | | 361/679.01 |
| 2017/0013924 | A1* | 1/2017 | Johnson | ............... H04B 1/3888 |

FOREIGN PATENT DOCUMENTS

TW             M530065 U    * 10/2016

* cited by examiner

*Primary Examiner* — Yuwen Pan
*Assistant Examiner* — Fatuma G Sherif

(57) ABSTRACT

An integrated structure of shell and film with high compatibility and convenient positioning includes a bottom shell and an upper cover, the bottom shell is provided with a mobile phone accommodating cavity, and the upper cover is buckled with the bottom shell to wrap the mobile phone accommodating cavity. The bottom shell is provided with a fixing structure for fixing a mobile phone, the fixing structure includes a fixing piece, the upper cover is provided with an avoiding position that cooperates with the fixing piece, and the fixing piece cooperates with the avoiding position to form a first positioning structure.

16 Claims, 19 Drawing Sheets

INTEGRATED STRUCTURE OF SHELL AND FILM WITH HIGH COMPATIBILITY AND CONVENIENT POSITIONING

CROSS REFERENCE TO RELATED APPLICATIONS

The present application is a continuation-in-part application of U.S. patent application Ser. No. 17/377,423 filed on Jul. 16, 2021, which claims the benefit of Chinese Patent Application Nos. 202121436055.9 and 202121439716.3 filed on Jun. 26, 2021. All the above are hereby incorporated by reference in their entirety.

TECHNICAL FIELD

The invention belongs to the technical field of mobile phone accessories, and particularly relates to an integrated structure of shell and film with high compatibility and convenient positioning.

BACKGROUND

The mobile phone needs to be protected during use. The existing mobile phone protective structure mainly includes a mobile phone shell, a mobile phone set, and a mobile phone film. Generally, mobile phone shells and mobile phone sets can only protect the back and sides of the mobile phone, while the mobile phone film can only protect the mobile phone screen, but cannot provide a single structure to effectively protect the entire mobile phone.

Based on this, an all-inclusive mobile phone shell has appeared on the market, which can protect the entire mobile phone. For example, in the prior art, a protective shell made of metal combined with plastic tempered glass is disclosed in the patent with patent number CN 208094642 U. The mobile phone shell includes a metal sheathed front cover and a protective back cover, and the protective back cover is clamped and installed on the metal sheathed front cover. The metal sheathed front cover includes a metal frame and a metal front surrounding edge. The metal front surrounding edge is installed above the metal frame. The four corners of the protective back cover are provided with fixed corner pieces, and the three fixed corner pieces are provided with a first clamping protrusion, the other fixed corner piece is provided with a dismounting groove corresponding to the lower part of the metal frame, and the metal frame is provided with a first clamping groove at the position corresponding to the first clamping protrusion. The metal sheathed front cover is in the front and the protective back cover is in the back, which fixes the mobile phone firmly; there is no need for deformation of the metal sheathed front cover during installation, so harder metal materials can be used; the protective back cover is clamped and installed on the metal sheathed front cover, which is firmly connected, and the clamping protrusion has a short stroke when clamping, and there is no need to leave a large sliding gap; a disassembly groove is provided in a corner of the metal frame for easy removal.

Although the protective shell can realize all-inclusive protection of the mobile phone, its bottom shell cannot be used alone on the mobile phone, and the upper and lower covers are inconvenient to install, the front cover is thick, and the operation of the mobile phone screen is not sensitive enough.

SUMMARY OF THE INVENTION

In order to solve the above-mentioned problems, the primary purpose of the present invention is to provide an integrated structure of shell and film with high compatibility and convenient positioning, which can fully cover the mobile phone and realize all-inclusive protection of the mobile phone;

Another object of the present invention is to provide an integrated structure of shell and film with high compatibility and convenient positioning, which can be used alone as a mobile phone shell;

Another object of the present invention is to provide an integrated structure of shell and film with high compatibility and convenient positioning, the fixing piece of which has both fixing and positioning functions.

Another object of the present invention is to provide an integrated structure of shell and film with high compatibility and convenient positioning, which has a dual positioning effect and is convenient for installation between the upper cover and the bottom shell;

The last object of the present invention is to provide an integrated structure of shell and film with high compatibility and convenient positioning, which can effectively strengthen the anti-drop performance of the bottom shell and strengthen the protection of the mobile phone.

In order to achieve the above objects, the technical scheme of the present invention is as follows:

The present invention provides an integrated structure of shell and film with high compatibility and convenient positioning, including a bottom shell and an upper cover, the bottom shell is provided with a mobile phone accommodating cavity, and the upper cover is buckled with the bottom shell to wrap the mobile phone accommodating cavity, and is characterized in that the bottom shell is provided with a fixing structure for fixing a mobile phone, the fixing structure includes a fixing piece, the upper cover is provided with an avoiding position that cooperates with the fixing piece, and the fixing piece cooperates with the avoiding position to form a first positioning structure.

Further, a positioning groove is provided on the bottom shell, a positioning protrusion cooperating with the positioning groove is provided on the upper cover, and the positioning protrusion is installed in the positioning groove to form a second positioning structure. In the present invention, the bottom shell and the upper cover can fully cover the mobile phone and realize all-inclusive protection of the mobile phone. Secondly, a fixing structure is provided on the bottom shell, which can fix the mobile phone, so that the bottom shell can be used alone as a mobile phone shell, which is more portable. In addition, by arranging a second positioning structure on the bottom shell, it is convenient to install the upper cover.

Further, the bottom shell and the upper cover both include a frame, the bottom shell further includes a bottom plate, the upper cover further includes a panel, the bottom plate is installed on the frame of the bottom shell, and the panel is installed on the frame of the upper cover. The frame of the bottom shell and the frame of the upper cover are seamlessly butted on the side of the mobile phone accommodating cavity, and the boundary line between the bottom shell and the upper cover can be set on the side of the mobile phone, when the upper cover is not tightly attached to the mobile phone screen and there are bubbles, it is easy to open the upper cover for exhaust.

Further, the frame is provided with a circle of L-shaped installation grooves, the bottom plate is arranged in the L-shaped installation groove of the frame of the bottom shell, and the bottom plate is flush with the L-shaped installation groove of the frame of the bottom shell; the panel is arranged in the L-shaped installation groove of the frame of the upper cover, and the panel is flush with the L-shaped installation groove of the frame of the upper cover. In the present invention, the panel can use tempered glass as the mobile phone film, and the tempered glass is flush with the L-shaped installation groove. During use, it is convenient to exhaust air between the panel and the mobile phone screen to realize the tightness between the panel and the mobile phone screen, it is convenient for users to operate the mobile phone screen, optimizing the bare-metal sense of the mobile phone, and effectively improving the user experience.

Further, the fixing piece continuously or intermittently surrounds the entire peripheral side or part of the peripheral side of the frame of the bottom shell. Or the fixing structure includes more than two fixing pieces, and the two or more fixing pieces are symmetrically arranged on the frame of the bottom shell. That is, in the specific structure design, the fixing piece can be arranged symmetrically on the frame of the bottom shell; it can also be arranged as a whole continuous fixing structure and surround the entire peripheral side of the frame of the bottom shell; it can also be arranged in a discontinuous manner as one or more segments of the fixing structure, and surround part of the peripheral side of the frame of the bottom shell.

Further, the avoiding position continuously or intermittently surrounds the entire peripheral side or part of the peripheral side of the frame of the upper cover. Or, there are more than two avoiding positions, which are symmetrically arranged on the frame of the upper cover. Namely, in the specific structural design, the avoiding positions can be symmetrically arranged on the frame of the upper cover, can also be arranged as a whole continuous avoiding structure and surround the entire peripheral side of the frame of the upper cover, and can also be arranged as in a discontinuous manner as one or more segments of the avoiding structures and surround part of the peripheral side of the frame of the upper cover. Namely, the positions of the avoiding positions on the frame of the upper cover correspond to the positions of the fixing pieces on the frame of the bottom shell.

Further, preferably, there are four fixing pieces, which are respectively arranged on four corners of the frame of the bottom shell. There are four avoiding positions, which are respectively arranged on four corners of the frame of the upper cover.

Or, there are six fixing pieces, of which four fixing pieces are respectively arranged on four corners of the frame of the bottom shell, and the other two fixing pieces are respectively arranged at the middle parts of the left side and the right side of the frame of the bottom shell; and there are six avoiding positions, of which four avoiding positions are respectively arranged on four corners of the frame of the upper cover, and the other two avoiding positions are respectively arranged at the middle parts of the left side and the right side of the frame of the upper cover.

Or, there are seven fixing pieces, of which four fixing pieces are respectively arranged on four corners of the frame of the bottom shell, the other two fixing pieces are respectively arranged at the middle parts of the left side and the right side of the frame of the bottom shell, and the last one fixing piece is arranged at the middle part of one end of the frame of the bottom shell; and there are seven avoiding positions, of which four avoiding positions are respectively arranged on four corners of the frame of the upper cover, the other two avoiding positions are respectively arranged at the middle parts of the left side and the right side of the frame of the upper cover, and the last one avoiding position is arranged at the middle part of one end of the frame of the upper cover.

Further, the fixing piece includes a connecting portion and a fixing portion, the fixing portion and the connecting portion are integrally formed, the fixing portion is fixed to the frame of the bottom shell through the connecting portion, and the fixing portion is perpendicular to the frame of the bottom shell.

Further, the fixing portion has a sheet structure.

Further, the positioning groove is arranged on the frame of the bottom shell.

Further, the positioning groove continuously or intermittently surrounds the entire peripheral side or part of the peripheral side of the frame of the bottom shell. Or, there are more than two positioning grooves, and the two or more positioning grooves are respectively symmetrically arranged on the left side and the right side of the frame of the bottom shell and are located on the side edges of the fixing pieces. That is, in the specific structural design, the positioning grooves can be arranged symmetrically on the left and right side frames of the bottom plate; it can also be arranged as a whole continuous structure and surround the entire peripheral side of the frame of the bottom shell; it can also be arranged in a discontinuous manner as one-stage or multiple-stage structure, and surrounds a part of the peripheral side of the frame of the bottom shell.

Further, the positioning protrusion continuously or intermittently surrounds the entire peripheral side or part of the peripheral side of the frame of the upper cover. Or, there are more than two positioning protrusions, which are respectively symmetrically arranged on the left side and the right side of the frame of the upper cover and are located on the side edges of avoiding grooves. Namely, in the specific structural design, the positioning protrusions can be symmetrically arranged on the left side and the right side of a frame of the bottom plate, can also be arranged as a whole continuous structure and surround the entire peripheral side of the frame of the upper cover, and can also be arranged as in a discontinuous manner as one or more segments of the avoiding structures and surround part of the peripheral side of the frame of the upper cover. Namely, the positions of the positioning protrusions on the frame of the upper cover correspond to the positions of the positioning grooves on the frame of the bottom shell.

Preferably, there are two positioning grooves, which are symmetrically arranged at the left end part and the right end part of the frame of the bottom shell and are located on the side edges of the fixing pieces; and there are two positioning protrusions, which are symmetrically arranged at the left end part and the right end part of the frame of the upper cover and are located on the side edges of the avoiding positions.

Or, there are four positioning grooves, which are respectively arranged at the middle parts of the left side of the right side of the frame of the bottom shell and on the two sides of the fixing pieces. There are four positioning protrusions, which are respectively arranged at the middle parts of the left side of the right side of the frame of the upper cover and on the two sides of the avoiding positions.

Further, the frame of the bottom shell is further provided with anti-drop protrusions, and there are more than two anti-drop protrusions, which are symmetrically arranged on the frame of the bottom shell.

Further, preferably, there are six anti-drop protrusions, of which four anti-drop protrusions are respectively provided on the four corners of the frame of the bottom shell, and the other two anti-drop protrusions are respectively provided on the left and right sides of the bottom plate.

Further, the frame of the bottom shell is further provided with movable buttons, the upper and lower sides of the movable buttons are provided with button connectors, and the movable buttons are connected to the frame of the bottom shell through the button connectors; and the inner sides of the movable buttons are also provided with button protrusions. In the present invention, by arranging the movable buttons, the buttons will not be fixed on the bottom shell, which facilitates the pressing of the buttons. The button protrusions can be supported on the buttons of the mobile phone, and the pressing is more labor-saving.

Further, the inner side of the frame of the bottom shell is also provided with anti-slip stripes, which can prevent slipping of the mobile phone.

Further, a button installation groove is further arranged on the frame of the bottom shell, and a ramp-shaped structure is arranged around the button installation groove. In the present invention, the ramp-shaped structure can facilitate the pressing of the buttons.

Further, the outer side of one fixing piece arranged on the bottom corner of the frame of the bottom shell is also provided with a notch groove, and the notch groove forms a disassembling position. The disassembling position can facilitate the disassembling of the upper cover; and the fixing piece can realize the integration of a fixing position and the disassembling position, simplify the product structure and improve the user experience.

The advantage of the present invention is that compared with the prior art:

First of all, the integrated shell film structure of the present invention is provided with a bottom shell and an upper cover, which can fully cover the mobile phone, and can realize all-inclusive protection of the mobile phone;

Secondly, the bottom shell of the present invention is provided with a mobile phone accommodating cavity, which can be used for accommodating mobile phones, and a fixing structure is also provided on the bottom shell, so that the bottom shell can be used alone as a mobile phone shell;

Thirdly, the fixing structure of the present invention can be used to fix a mobile phone, and the fixing piece can cooperate with the avoiding position on the upper cover to form a first positioning structure for positioning the upper cover and the bottom shell when the upper cover is installed, so that the fixing piece can have both fixing and positioning functions;

In addition, the bottom shell and the upper cover of the present invention are provided with a second positioning structure, which can cooperate with the first positioning structure to realize the dual positioning effect of the bottom shell and the upper cover, and when positioning, it is able to exhaust air between the upper cover of the mobile phone and the screen of the mobile phone from the locating position, which is convenient for the installation and fitting of the top cover;

Finally, the bottom shell of the present invention is provided with anti-drop protrusions, which can effectively enhance the anti-drop performance of the bottom shell and enhance the protection of the mobile phone.

DESCRIPTION OF THE EMBODIMENTS

Figure 1:
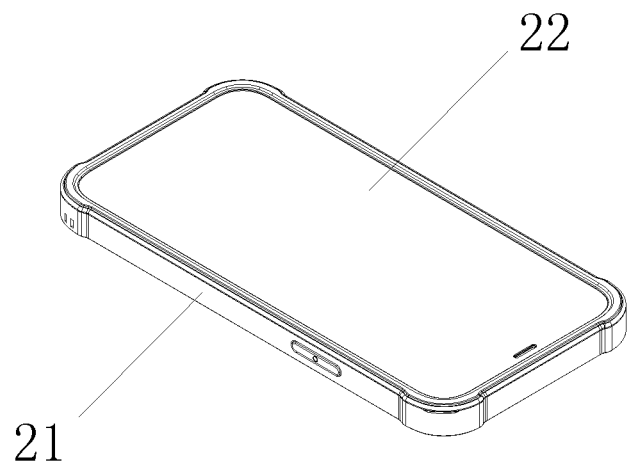
FIG. 1 is an axonometric drawing of an embodiment 1.
Figure 2:
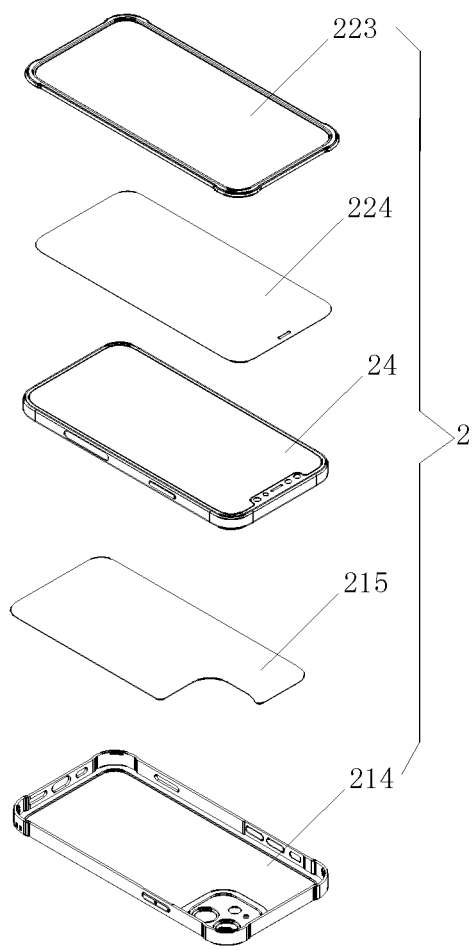
FIG. 2 is an exploded drawing of the embodiment 1.
Figure 3:
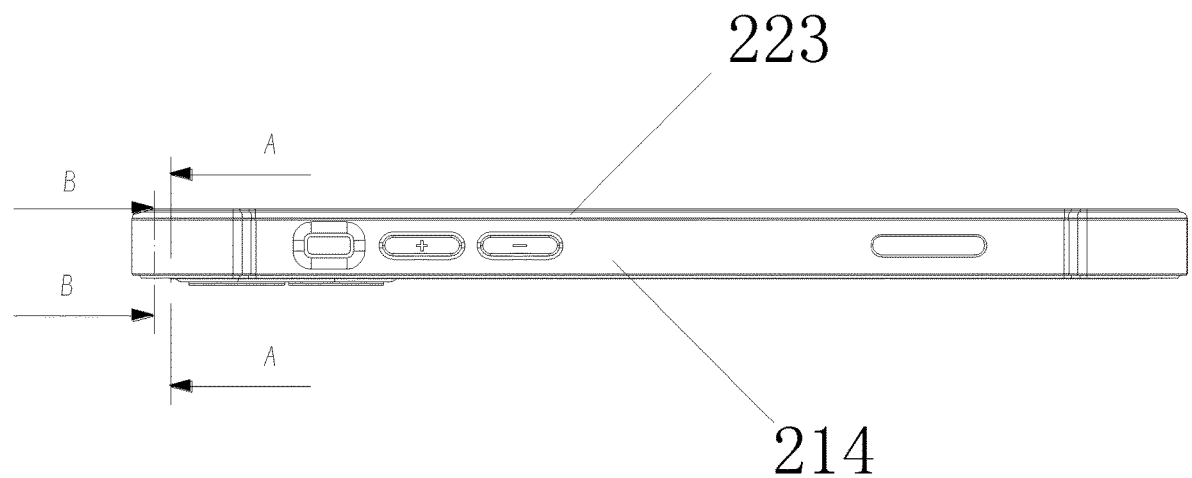
FIG. 3 is a left view of the embodiment 1.
Figure 4:
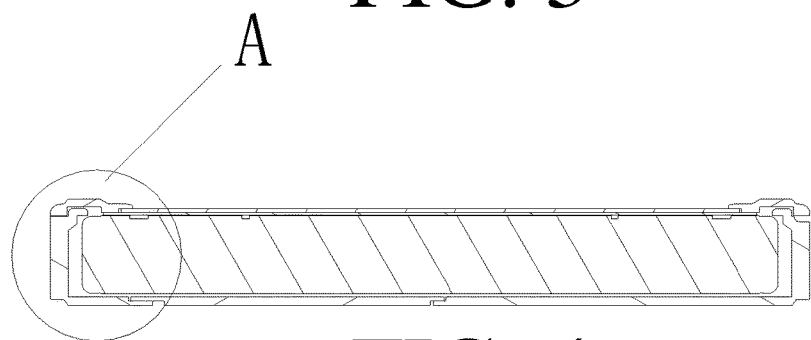
FIG. 4 is a sectional view of A-A in FIG. 3.
Figure 5:
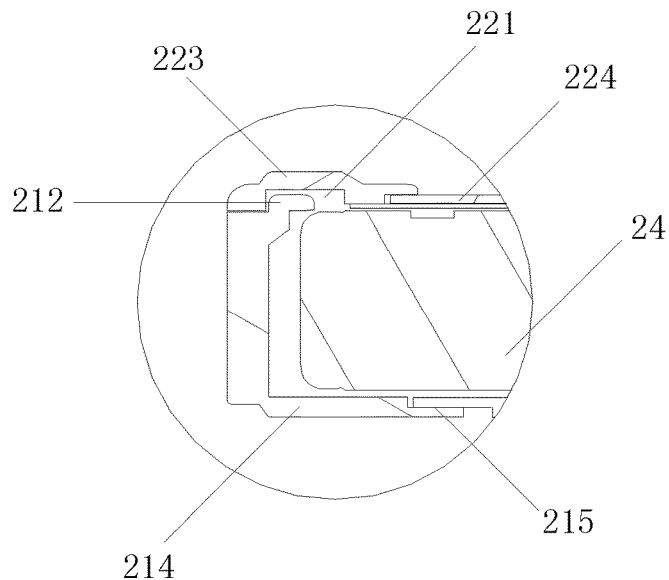
FIG. 5 is a partial enlarged view of A in FIG. 4.
Figure 6:
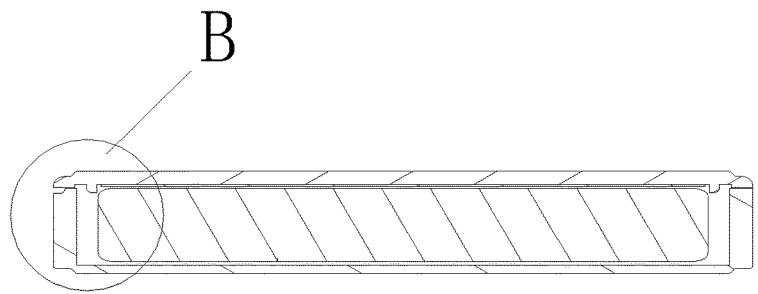
FIG. 6 is a sectional view of B-B in FIG. 3.
Figure 7:
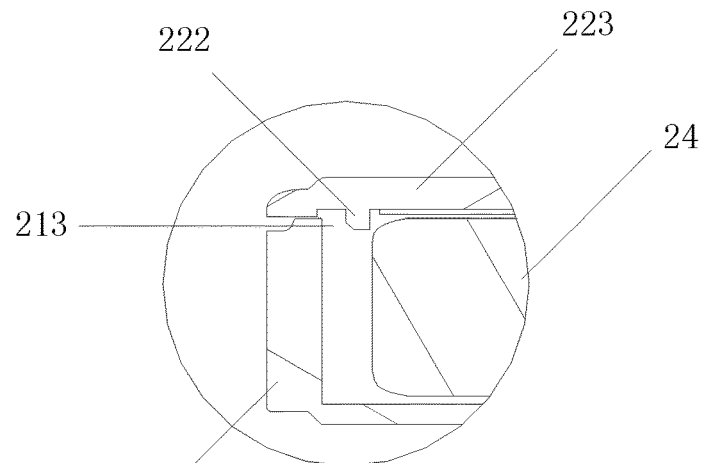
FIG. 7 is a partial enlarged view of B in FIG. 6.
Figure 8:
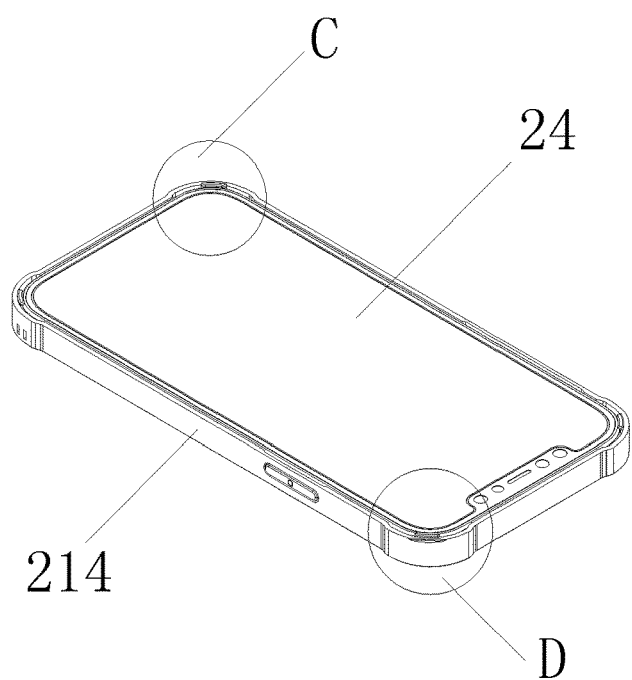
FIG. 8 is a schematic diagram of assembly of a mobile phone and a bottom shell in the embodiment 1.
Figure 9:
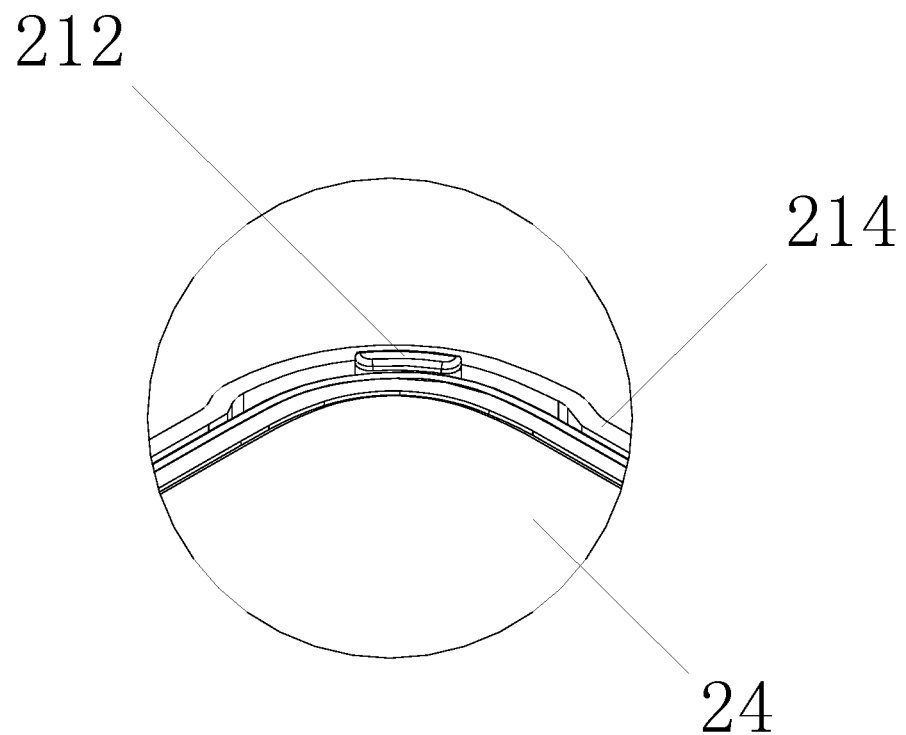
FIG. 9 is a partial enlarged view of C in FIG. 8.
Figure 10:
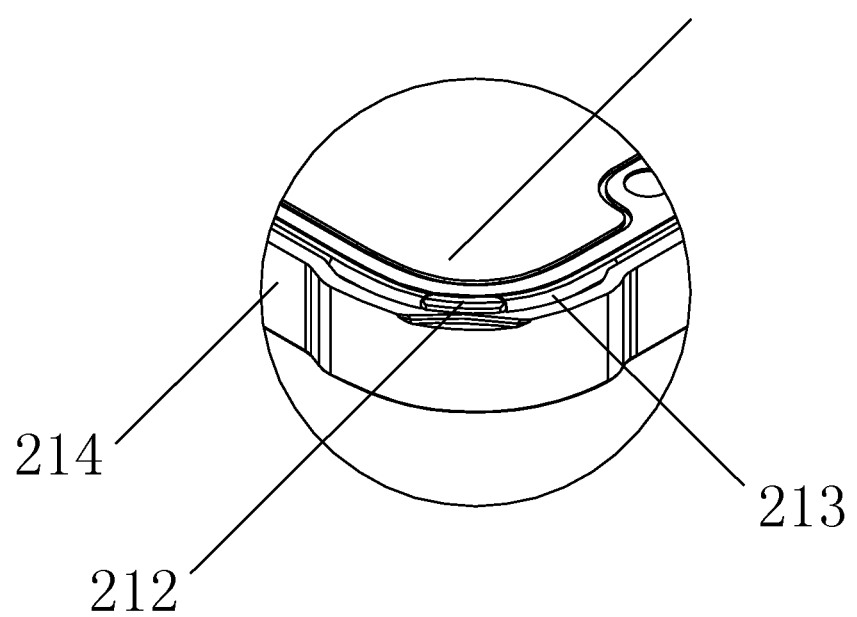
FIG. 10 is a partial enlarged view of D in FIG. 8.
Figure 11:
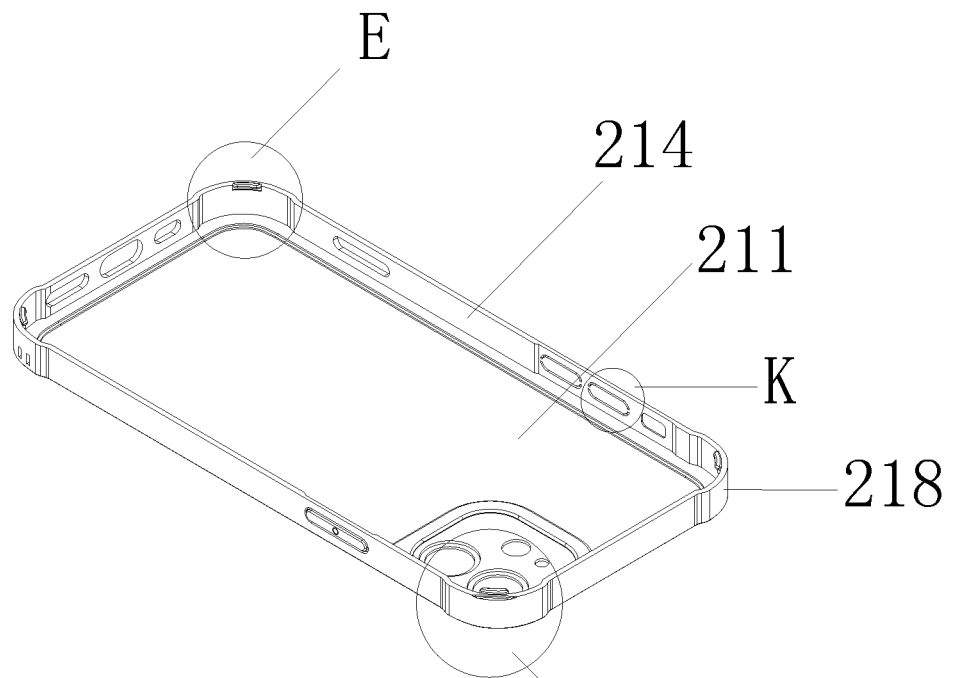
FIG. 11 is an axonometric drawing of a frame of the bottom shell in the embodiment 1.
Figure 12:
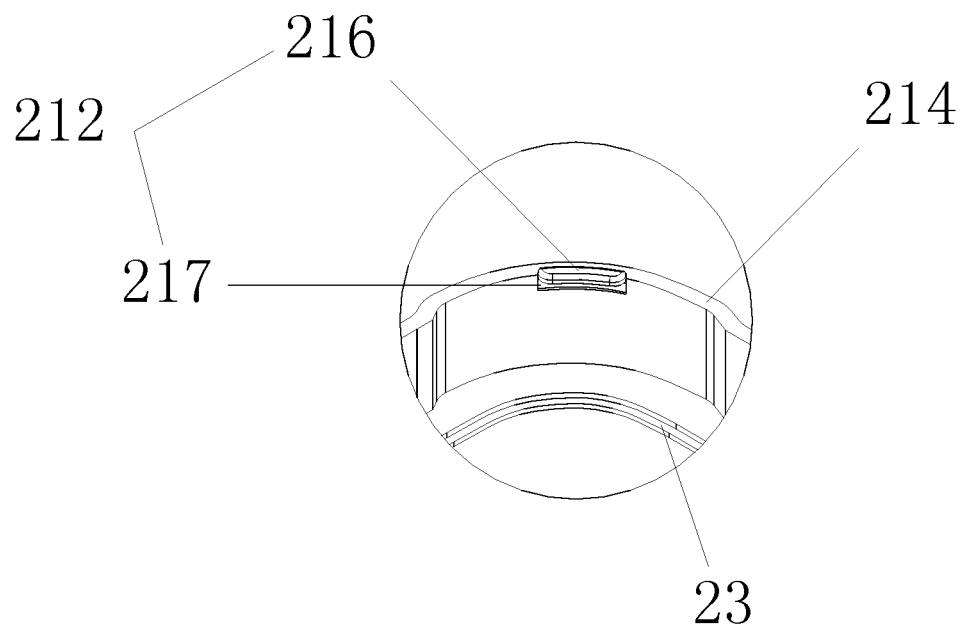
FIG. 12 is a partial enlarged view of E in FIG. 11.
Figure 13:
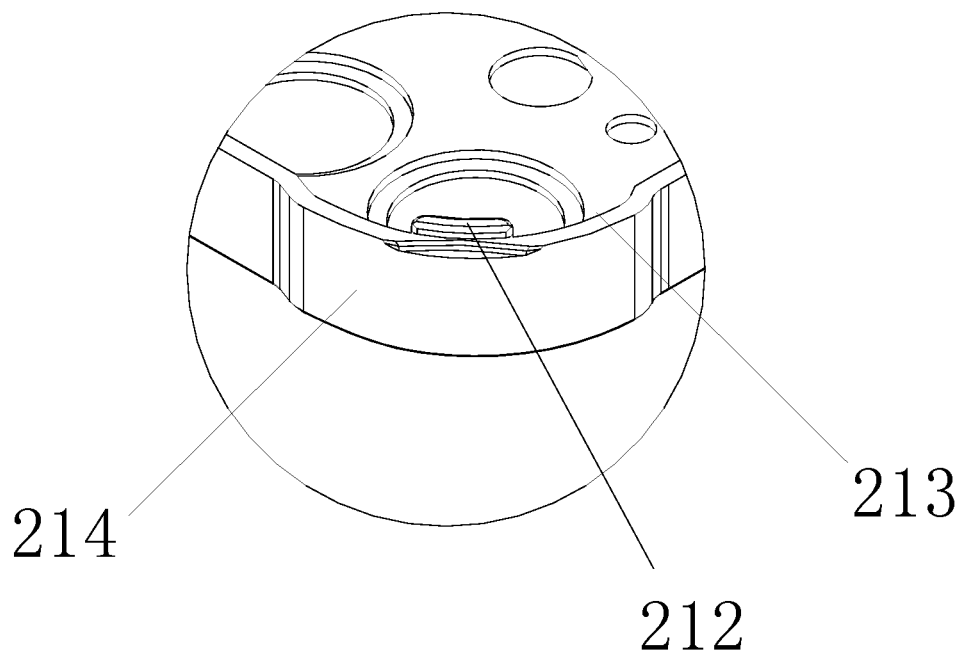
FIG. 13 is a partial enlarged view of F in FIG. 11.
Figure 14:
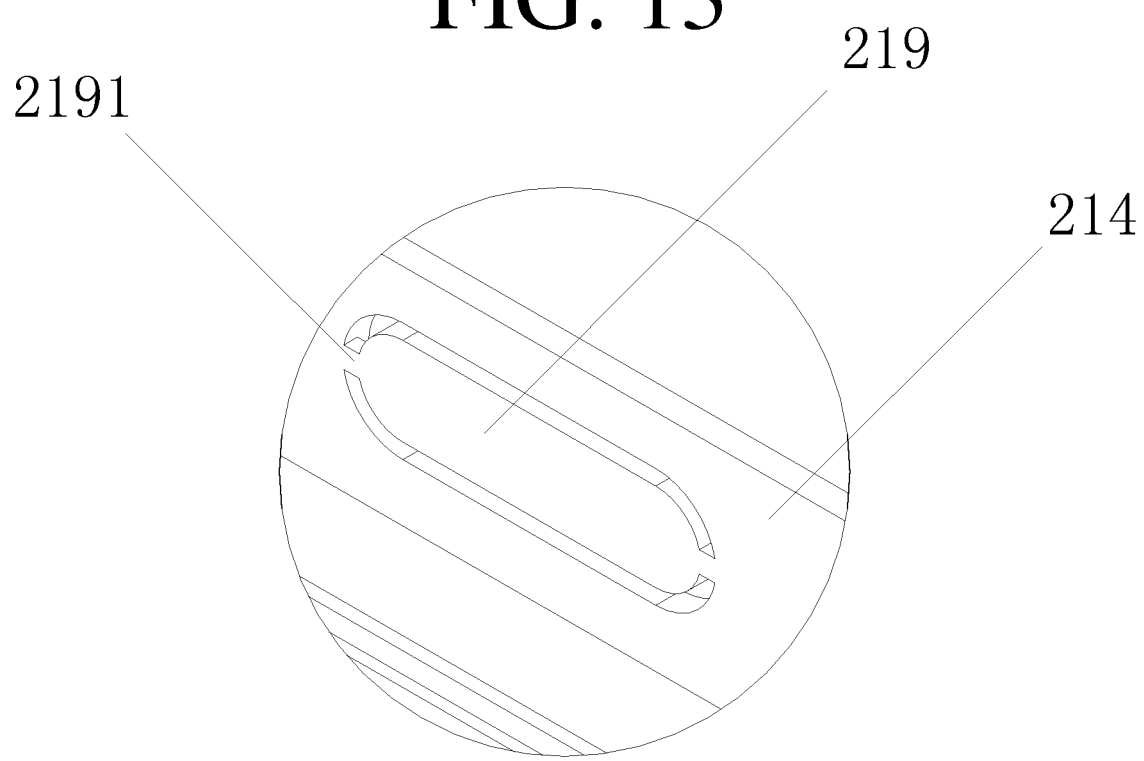
FIG. 14 is a partial enlarged view of K in FIG. 11.
Figure 15:
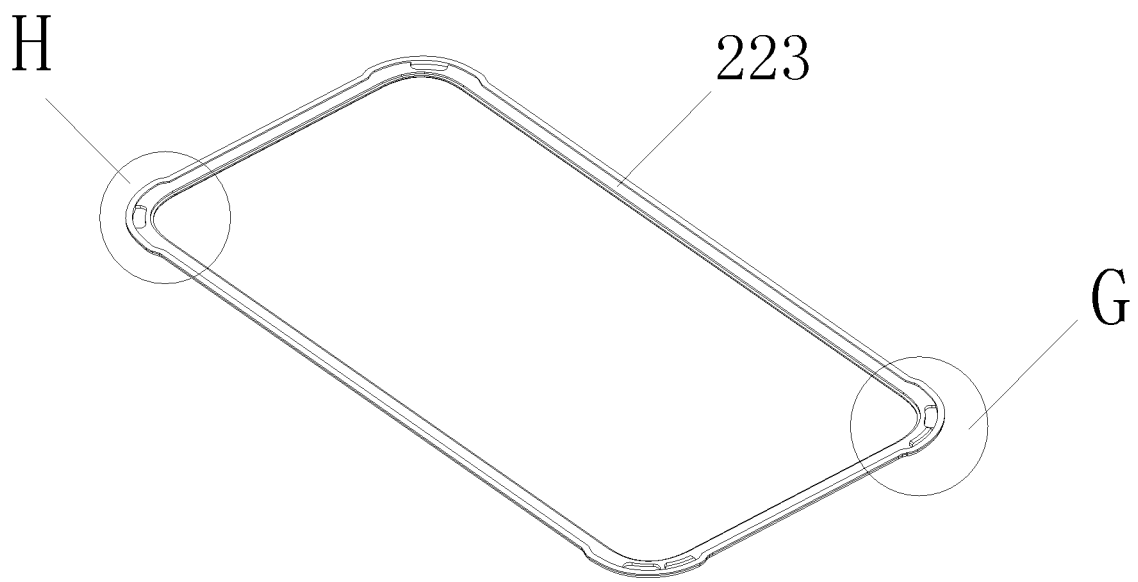
FIG. 15 is an axonometric drawing of a frame of the upper cover in the embodiment 1.
Figure 16:
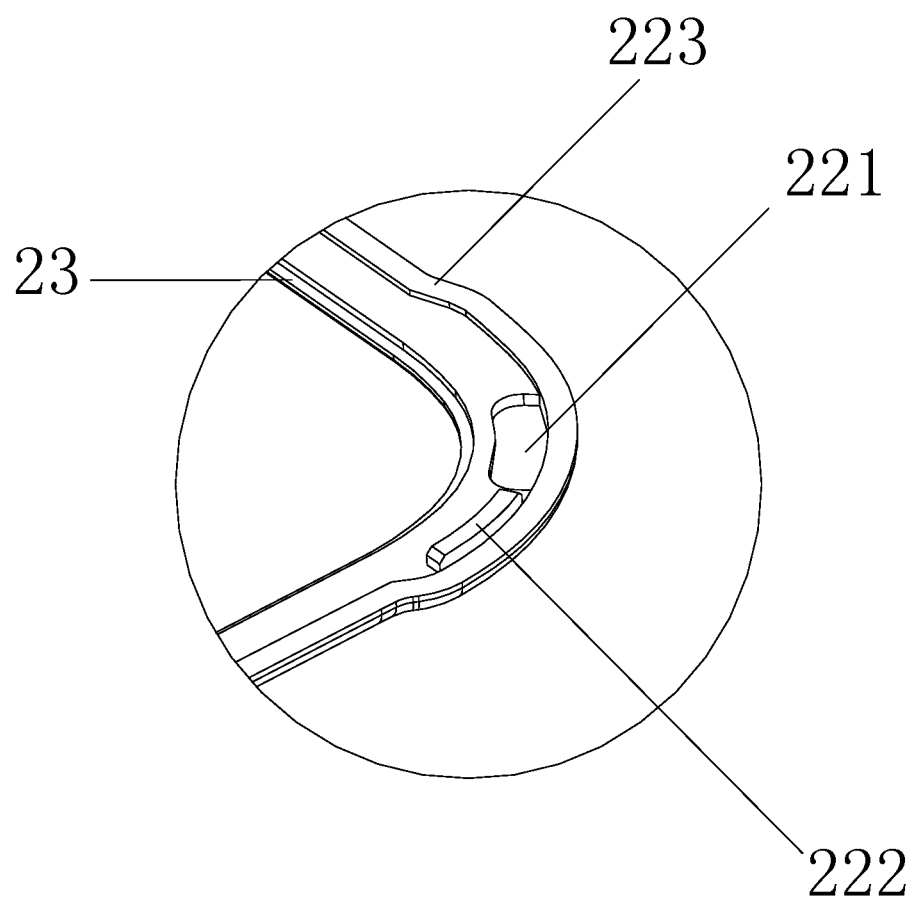
FIG. 16 is a partial enlarged view of G in FIG. 15.
Figure 17:
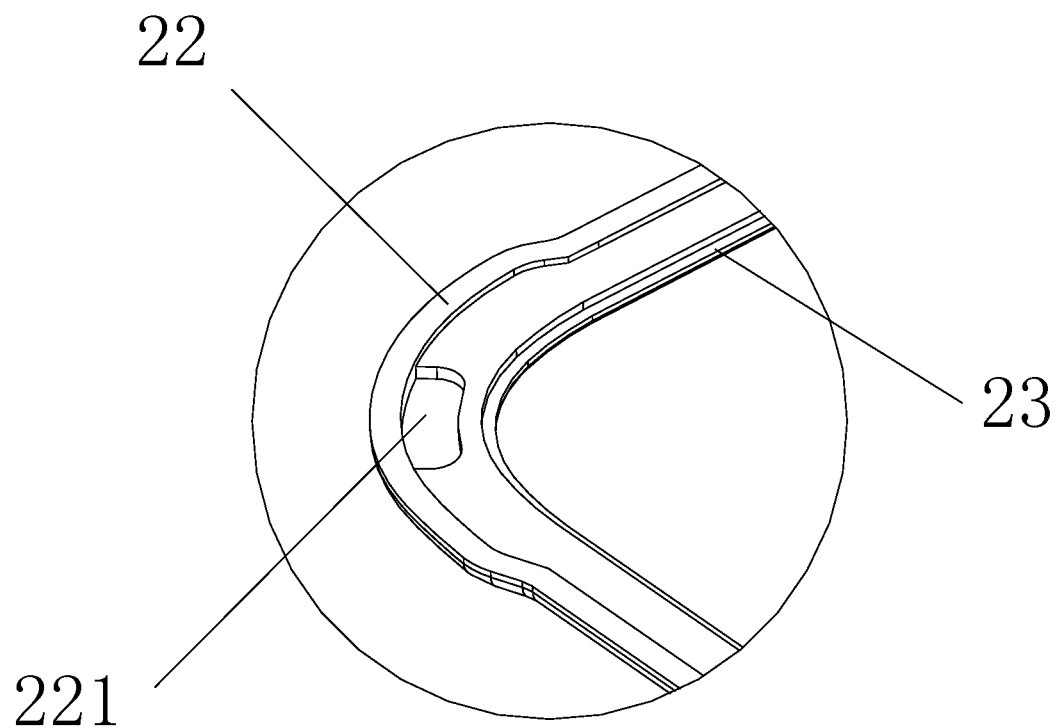
FIG. 17 is a partial enlarged view of H in FIG. 15.
Figure 18:
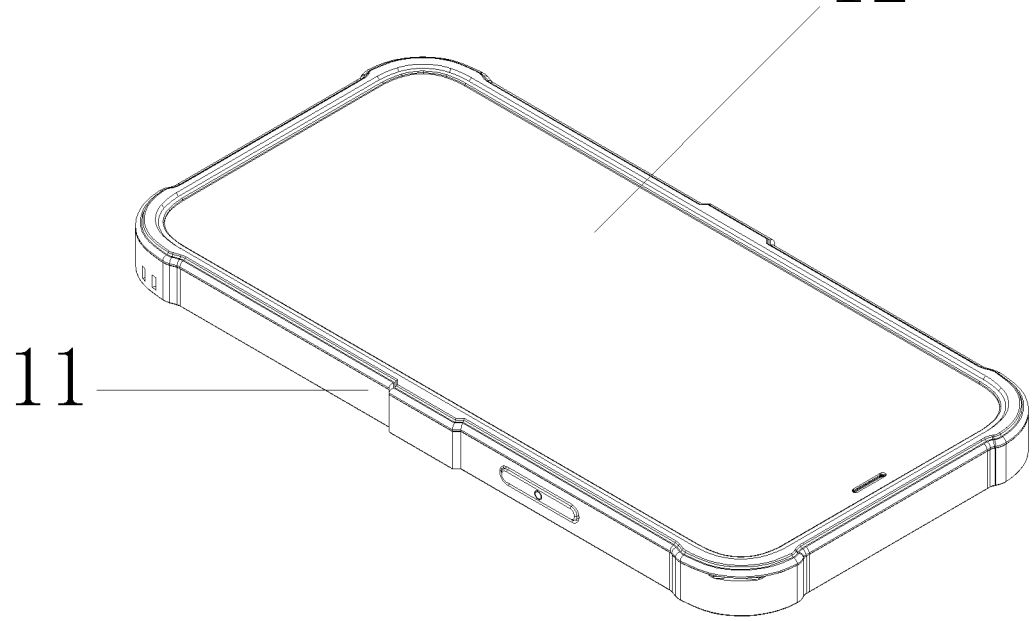
FIG. 18 is an axonometric drawing of an embodiment 2.
Figure 19:
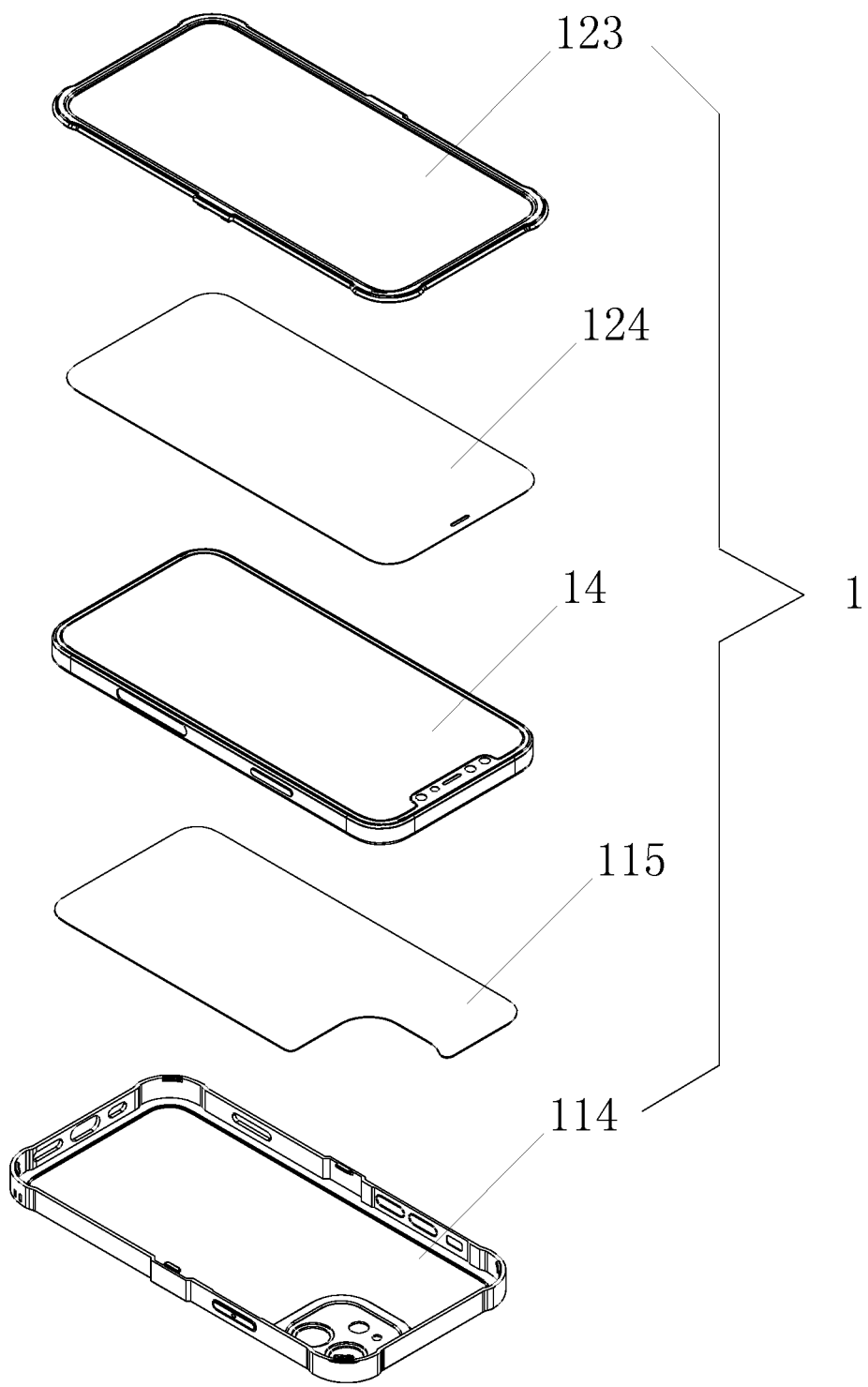
FIG. 19 is an exploded drawing of the embodiment 2.
Figure 20:
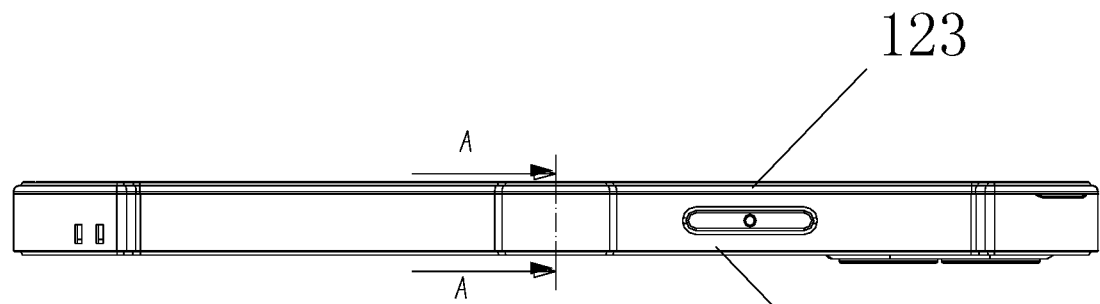
FIG. 20 is a left view of the embodiment 2.
Figure 21:
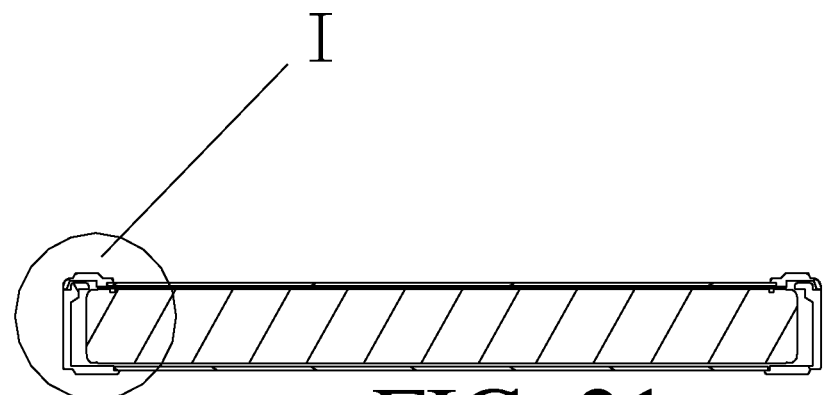
FIG. 21 is a sectional view of A-A in FIG. 20.
Figure 22:
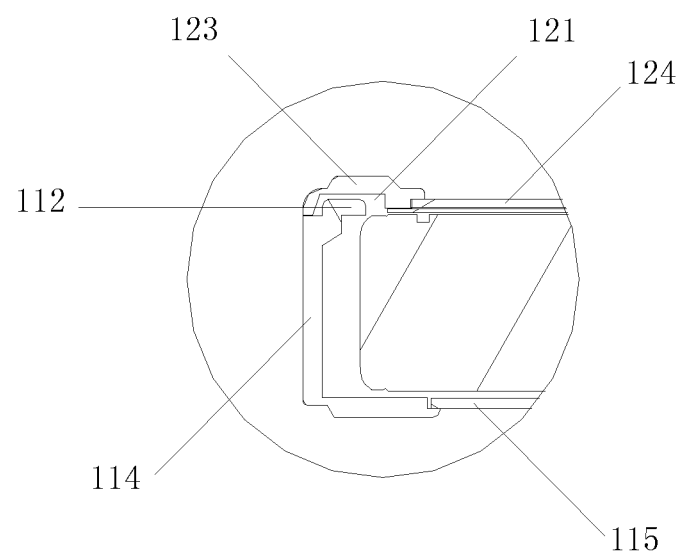
FIG. 22 is a partial enlarged view of I in FIG. 21.
Figure 23:
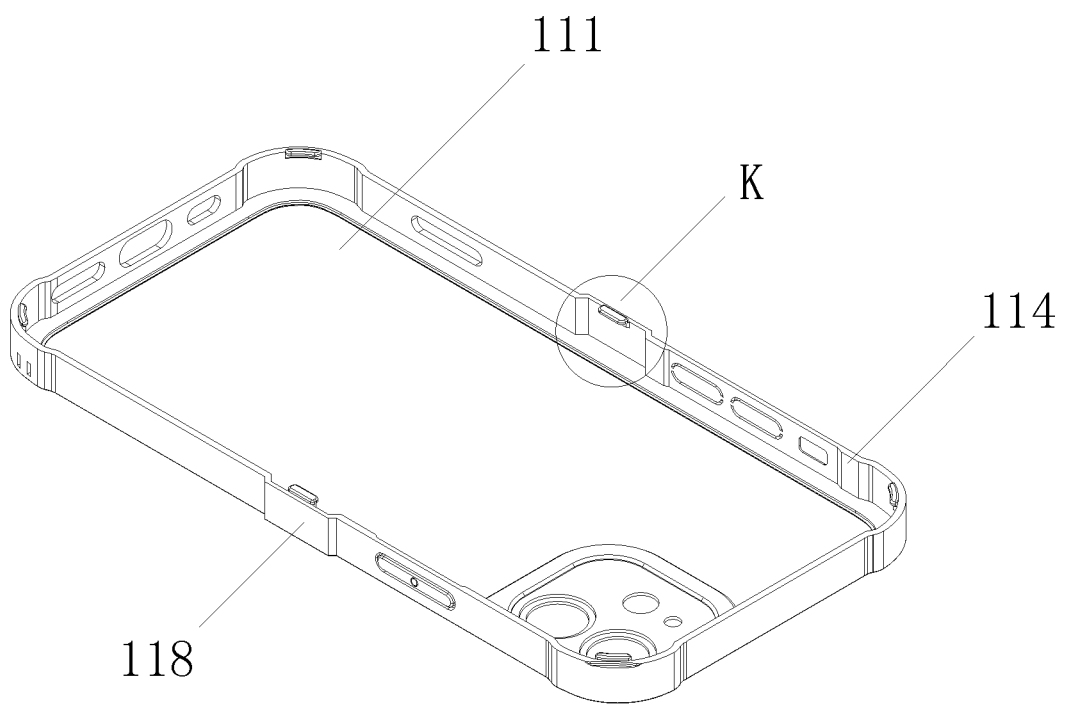
FIG. 23 is a schematic diagram of assembly of a mobile phone and a bottom shell in the embodiment 2.
Figure 24:
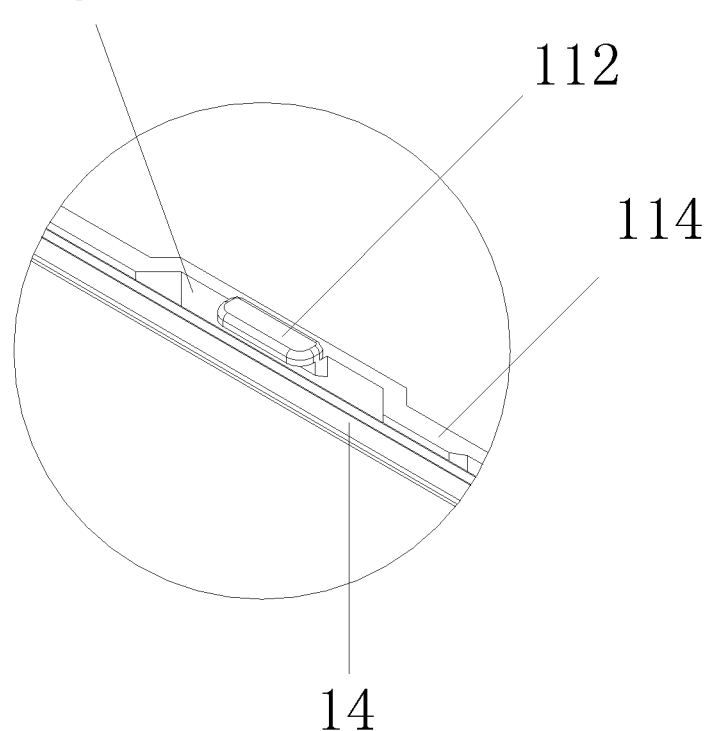
FIG. 24 is a partial enlarged view of J in FIG. 23.
Figure 25:
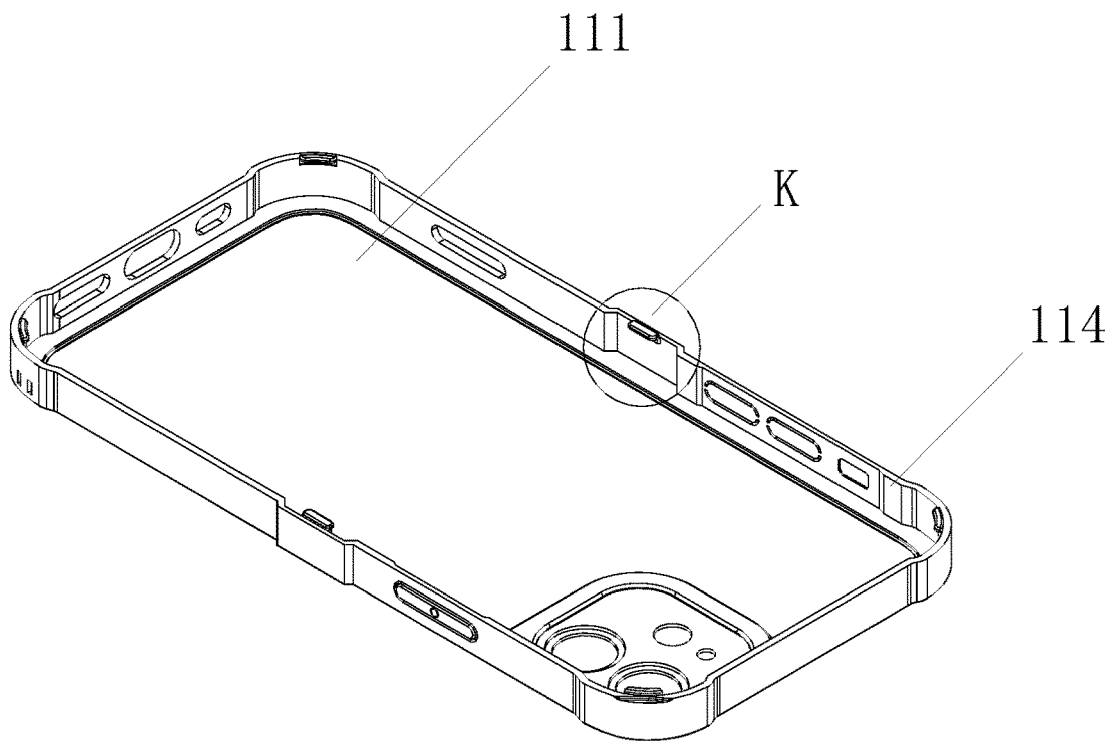
FIG. 25 is an axonometric drawing of a frame of the bottom shell in the embodiment 2.
Figure 26:
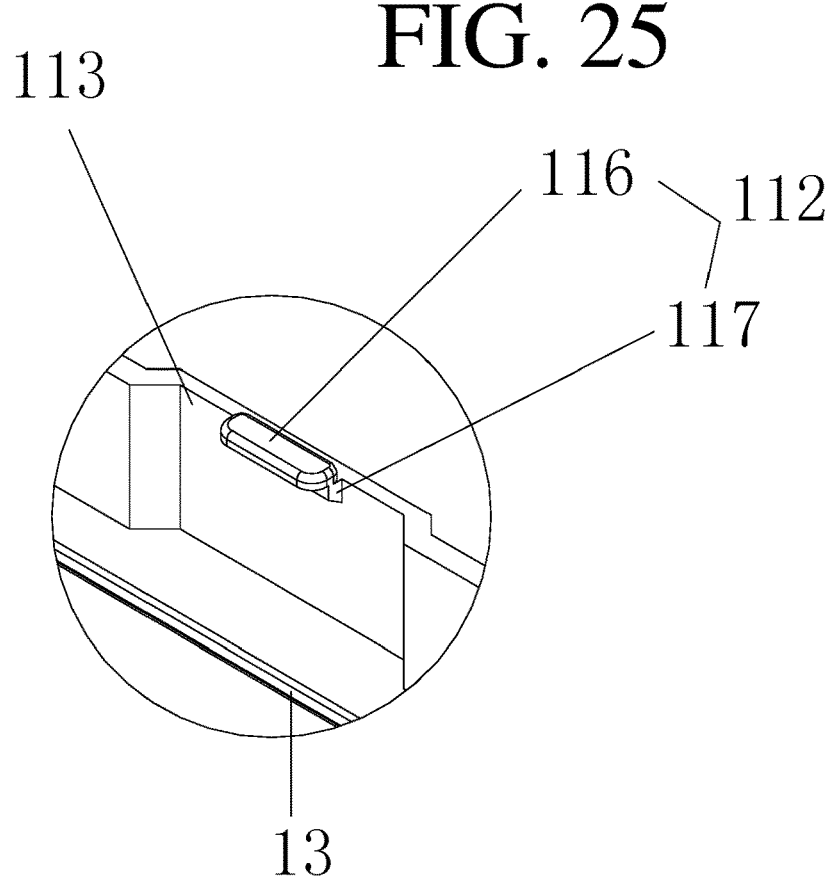
FIG. 26 is a partial enlarged view of K in FIG. 25.
Figure 27:
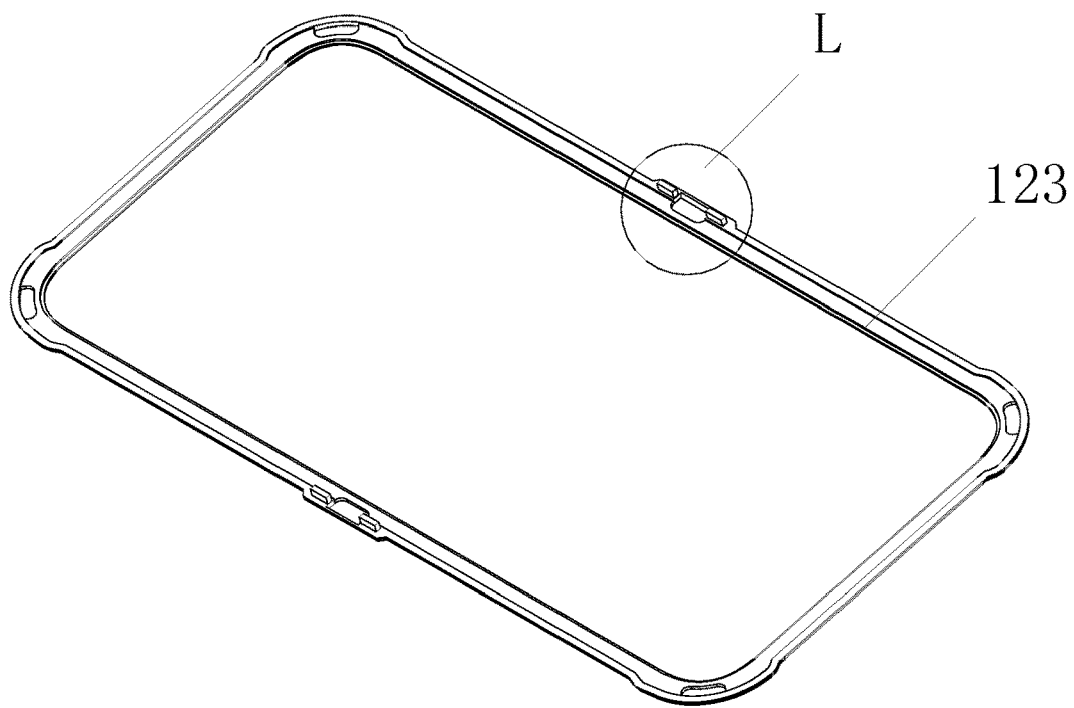
FIG. 27 is an axonometric drawing of a frame of the upper cover in the embodiment 2.
Figure 28:
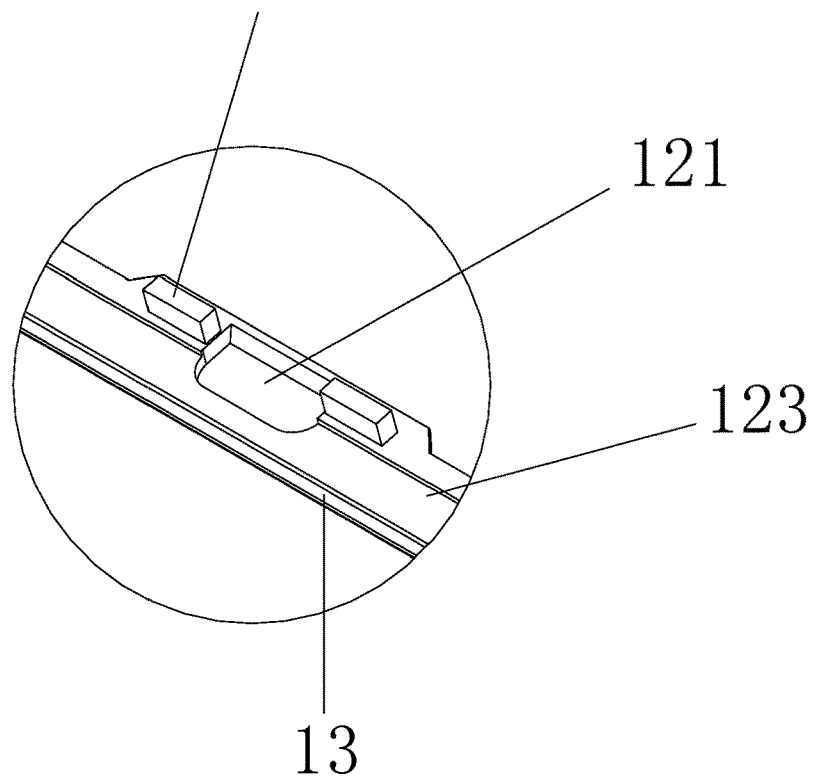
FIG. 28 is a partial enlarged view of L in FIG. 15.
Figure 29:
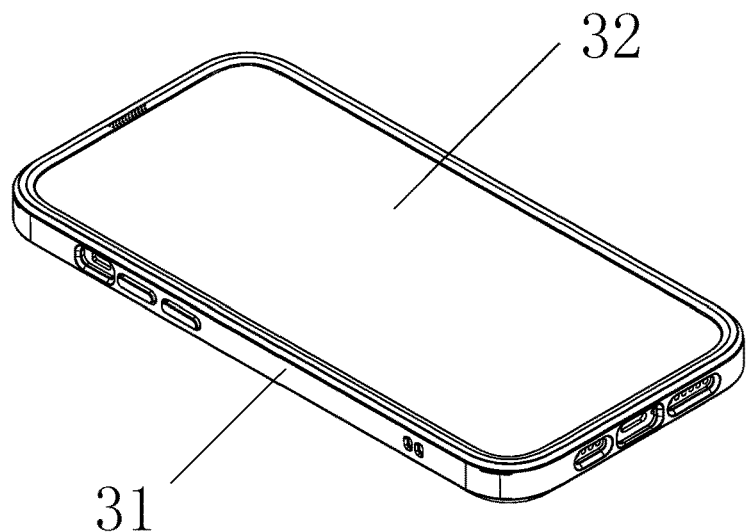
FIG. 29 is an axonometric drawing of an embodiment 3.
Figure 30:
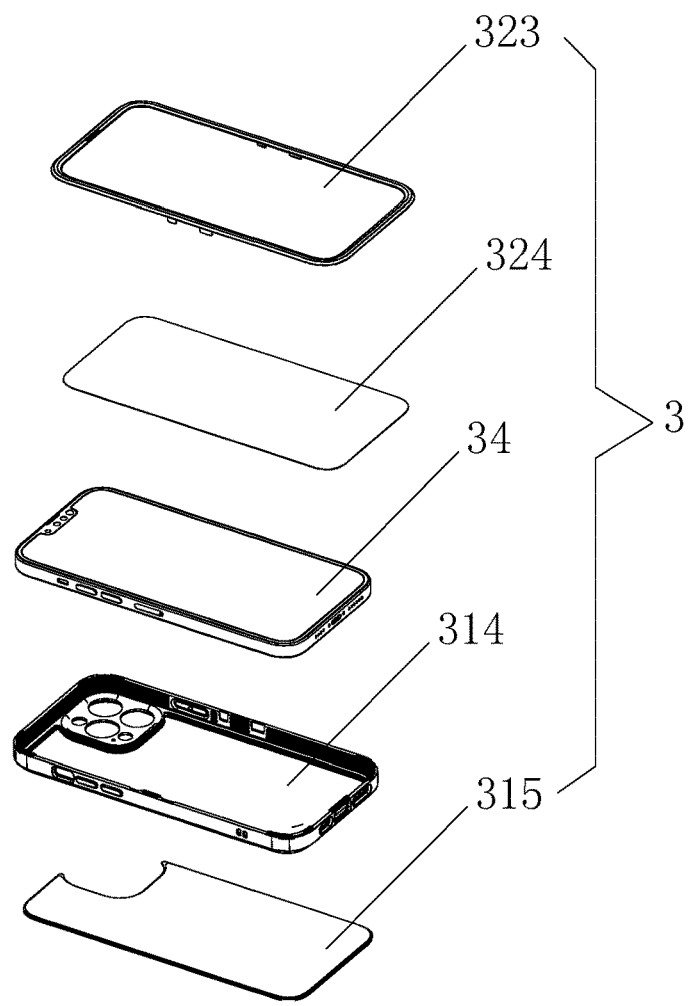
FIG. 30 is an exploded drawing of the embodiment 3.
Figure 31:
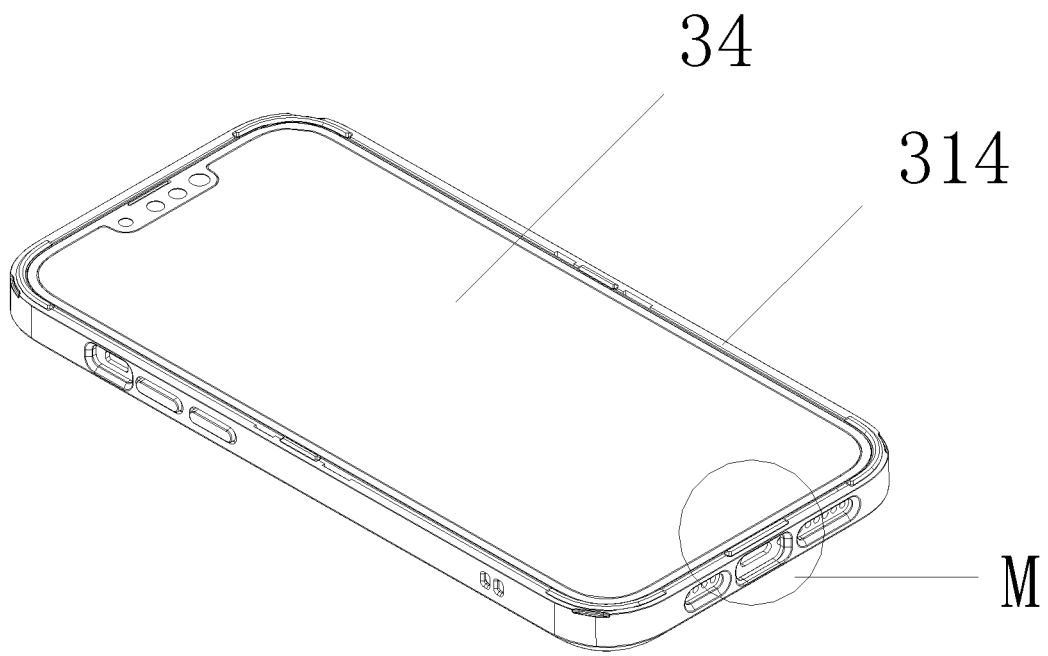
FIG. 31 is a schematic diagram of assembly of a mobile phone and a bottom shell in the embodiment 3.
Figure 32:
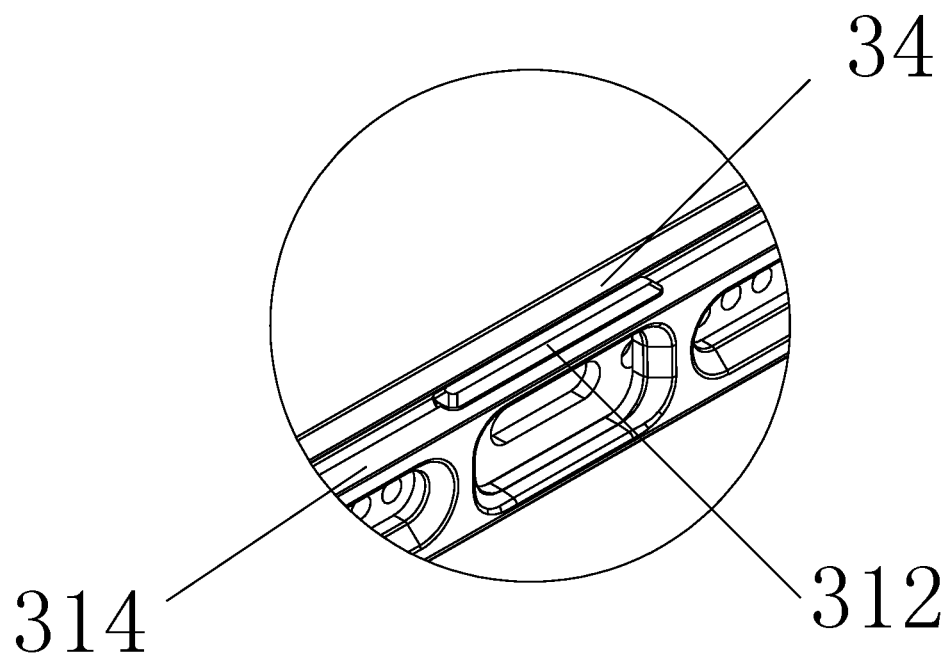
FIG. 32 is a partial enlarged view of M in FIG. 31.

In order to make the objects, technical schemes, and advantages of the present invention clearer, the following further describes the present invention in detail with reference to the accompanying drawings and embodiments. It should be understood that the specific embodiments described here are only used to explain the present invention, but not to limit the present invention.

Embodiment 1

Referring to FIGS. 1-17, this embodiment provides an integrated structure of shell and film with four buckling positions and end positioning, including a bottom shell 21 and an upper cover 22, the bottom shell 21 is provided with a mobile phone accommodating cavity 211, and the upper cover 22 is buckled with the bottom shell 21 to wrap the mobile phone accommodating cavity 211, and the bottom shell 21 is provided with a fixing structure, the fixing structure includes a fixing piece 212, the upper cover is provided with an avoiding position 221 that cooperates with the fixing piece 212, and the fixing piece 212 is installed in the avoiding position 221 to form a first positioning structure.

A positioning groove 213 is provided on the bottom shell 21, a positioning protrusion 222 cooperating with the positioning groove 213 is arranged on the upper cover 22, and the positioning protrusion 222 is installed in the positioning groove 213 to form a second positioning structure. In this embodiment, the bottom shell 21 and the upper cover 22 can fully cover a mobile phone 24 and realize all-inclusive protection of the mobile phone 24. Secondly, a fixing structure is arranged on the bottom shell 21, which can fix the mobile phone 24, so that the bottom shell 21 can be used alone as a mobile phone shell, which is more portable. In addition, by arranging the second positioning structure on the bottom shell 21, it is convenient to install the upper cover.

The bottom shell 21 includes a frame 214 of the bottom shell 21 and a bottom plate 215, the upper cover includes a frame 223 of the upper cover 22 and a panel 224, the bottom plate 215 is installed on the frame 214 of the bottom shell 21, and the panel 224 is installed on the frame 223 of the upper cover 22.

The frame 214 of the bottom shell 21 and the frame 223 of the upper cover 22 are provided with a circle of L-shaped installation grooves 23, the bottom plate 215 is arranged in the L-shaped installation groove 23 of the frame 214 of the bottom shell 21, and the bottom plate 215 is flush with the L-shaped installation groove 23 of the frame 214 of the bottom shell 21; the panel 224 is arranged in the L-shaped installation groove 23 of the frame 223 of the upper cover 22, and the panel 224 is flush with the L-shaped installation groove 23 of the frame 223 of the upper cover 22. In this embodiment, the panel 224 can use tempered glass as the mobile phone film, and the tempered glass is flush with the L-shaped installation groove 23. During use, it is convenient to exhaust air between the panel 224 and the mobile phone screen to realize the tightness between the panel 224 and the mobile phone screen, it is convenient for users to operate the mobile phone screen, optimizing the bare-metal sense of the mobile phone 24, and effectively improving the user experience.

The frame 214 of the bottom shell 21 and the frame 223 of the upper cover 22 are seamlessly butted on the side of the mobile phone accommodating cavity 211, and the boundary line between the bottom shell 21 and the upper cover 22 can be arranged on the side edge of the mobile phone 24. When the upper cover 22 is not tightly attached to the mobile phone screen to generate bubbles, it is easy to open the upper cover 22 for exhaust.

Referring to FIGS. 11-17, in this embodiment, there are four fixing pieces 212, which are respectively arranged on four corners of the frame 214 of the bottom shell 21; and there are four avoiding positions 221, which are respectively arranged on four corners of the frame 223 of the upper cover 22. When the frame 214 of the bottom shell 21 and the frame 223 of the upper cover 22 are assembled, the fixing piece 212 in a partial enlarged view of F in FIG. 11 corresponds to the avoiding position 221 in a partial enlarged view of G in FIG. 15, and the fixing piece 212 in a partial enlarged view of E in FIG. 11 corresponds to the avoiding position 221 in a partial enlarged view of H in FIG. 15.

In this embodiment, the fixing piece 212 includes a connecting portion 217 and a fixing portion 216, the fixing portion 216 and the connecting portion 217 are integrally formed, the fixing portion 216 is fixed to the frame 214 of the bottom shell 21 through the connecting portion 217, and the fixing portion 216 is perpendicular to the frame 214 of the bottom shell 21. In this embodiment, the fixing portion 216 has a sheet structure.

In this embodiment, there are two positioning grooves 213, which are respectively symmetrically arranged at the left end part and the right end part of the frame 214 of the bottom shell 21 and are located on the side edges of the fixing pieces 212. There are two positioning protrusions 222, which are respectively symmetrically arranged at the left part and the right part of the frame 223 of the upper cover 22 and are located on the side edges of the avoiding positions 221. When in use, the positioning protrusions are installed in the positioning grooves, and then air is exhausted from one side of the frame at the same time, which is closer to the habits of the users and convenient for operation.

The frame 214 of the bottom shell 21 is also provided with anti-drop protrusions 218, there are four anti-drop protrusions 218, which are respectively arranged on the four corners of the frame 214 of the bottom shell 21. The fixing pieces 212 and the positioning grooves 213 are arranged on the inner side surfaces of the anti-drop protrusions 218, so that drop resistance is integrated with fixing and positioning, which is convenient to simplify the structure.

The frame 214 of the bottom shell 21 is further provided with movable buttons 219, and the upper and lower sides of the movable buttons 219 are provided with button connectors 2191, and the movable buttons 219 are connected to the frame 214 of the bottom shell 21 through the button connectors 2191. In this embodiment, by arranging the movable buttons 219, the buttons will not be fixed on the bottom shell 21, which facilitates the pressing of the buttons.

In this embodiment,
the method of using the integrated structure of shell and film of this embodiment is:
1. Install the mobile phone 24 in the bottom shell 21, and fix the mobile phone 24 with the fixing piece 212 on the frame 214 of the bottom shell 21;
2. Use the second positioning structure to install the upper cover 22 on the bottom shell 21;
3. From the second positioning structure in the middle of the bottom shell 21 as a starting point, exhaust air along the upper and lower sides, attach the panel to the mobile phone screen, and use the suction between the panel and the mobile phone screen to realize the fixation of the upper cover 22.

Embodiment 2

Referring to FIGS. 18-28, this embodiment provides an integrated structure of shell and film with six buckling positions and middle positioning, including a bottom shell 11 and an upper cover 12, the bottom shell 11 is provided with a mobile phone accommodating cavity 111, and the upper cover 12 is buckled with the bottom shell 11 to wrap the mobile phone accommodating cavity 111, and the bottom shell 11 is provided with a fixing structure, the fixing structure includes a fixing piece 112, the upper cover is provided with an avoiding position 121 that cooperates with the fixing piece 112, and the fixing piece 112 cooperates with the avoiding position 121 to form a first positioning structure.

A positioning groove 113 is arranged on the bottom shell 11, a positioning protrusion 122 cooperating with the positioning groove 113 is arranged on the upper cover 12, and the positioning protrusion 122 is installed in the positioning groove 113 to form a second positioning structure. In this embodiment, the bottom shell 11 and the upper cover 12 can fully cover the mobile phone and realize all-inclusive protection of the mobile phone. Secondly, a fixing structure is arranged on the bottom shell 11, which can fix the mobile phone, so that the bottom shell 11 can be used alone as a mobile phone shell, which is more portable. In addition, by arranging the second positioning structure on the bottom shell 11, it is convenient to install the upper cover 12.

The bottom shell 11 includes a frame 114 of bottom shell 11 and a bottom plate 115, the upper cover 12 includes a frame 123 of the upper cover 12 and a panel 124, the bottom plate 115 is installed on the frame 114 of the bottom shell 11, and the panel 124 is installed on the frame 123 of the upper cover 12.

The frame 114 of the bottom shell 11 and the frame 123 of the upper cover 12 are provided with a circle of L-shaped installation grooves 13, the bottom plate 115 is arranged in the L-shaped installation groove 13 of the frame 114 of the bottom shell 11, and the bottom plate 115 is flush with the L-shaped installation groove 13 of the frame 114 of the bottom shell 11; the panel 124 is arranged in the L-shaped installation groove 13 of the frame 123 of the upper cover 12, and the panel 124 is flush with the L-shaped installation groove 13 of the frame 123 of the upper cover 12. In this embodiment, the panel 124 can use tempered glass as the mobile phone film, and the tempered glass is flush with the L-shaped installation groove 13 of the frame 123 of the upper cover 12. During use, it is convenient to exhaust air between the panel 124 and the mobile phone screen to realize the tightness between the panel 124 and the mobile phone screen, and it is convenient for users to operate the mobile phone screen, optimizing the bare-metal sense of the mobile phone 14, and effectively improving the user experience.

The frame 114 of the bottom shell 11 and the frame 123 of the upper cover 12 are seamlessly butted on the side of the mobile phone accommodating cavity 111, and the boundary line between the bottom shell 11 and the upper cover 12 can be arranged on the side edge of the mobile phone 14. When the upper cover 12 is not tightly attached to the mobile phone screen to generate bubbles, it is easy to open the upper cover 12 for exhaust.

In this embodiment, there are six fixing pieces 112 and six avoiding positions, of which four fixing pieces 112 are respectively arranged on the four corners of the frame 114 of the bottom shell 11, the positions of which are the same as the positions of the fixing pieces in the embodiment 1, and the structure refers to the figure of the fixing pieces in the embodiment 1. The other two fixing pieces 112 are respectively arranged at the middle parts of the left side and the right side of the frame 114 of the bottom shell 11. Four avoiding positions are arranged on the four corners of the frame 123 of the upper cover 12, the positions of which are the same as the positions of the avoiding positions in the embodiment 1, and the structure refers to the figure of the avoiding positions in the embodiment 1. The other two avoiding positions are respectively arranged at the middle parts of the left side and the right side of the frame 123 of the upper cover 12. Referring to FIGS. 25-28, the fixing piece 112 in a partial enlarged view of K in FIG. 25 corresponds to the avoiding position 121 in a partial enlarged view of L in FIG. 27.

The fixing piece 112 includes a connecting portion 117 and a fixing portion 116, the fixing portion 116 and the connecting portion 117 are integrally formed, the fixing portion 116 is fixed to the frame 114 of the bottom shell 11 through the connecting portion 117, and the fixing portion 116 is perpendicular to the frame 114 of the bottom shell 11. In this embodiment, the fixing portion 116 has a sheet structure.

In this embodiment, there are four positioning grooves 113, which are respectively arranged at two middle parts of the frame 114 of the bottom shell 11 and on the two sides of the fixing pieces 112. There are four positioning protrusions 122, which are respectively arranged at two middle parts of the frame 123 of the upper cover 12 and on the two sides of the avoiding positions 121. When in use, the positioning protrusions 122 are installed in the positioning grooves 113, and then air is exhausted from the two sides of the positioning grooves 113 at the same time, which is convenient to install the upper cover.

The frame 114 of the bottom shell 11 is also provided with anti-drop protrusions 118, there are six anti-drop protrusions 118, of which four anti-drop protrusions 118 are respectively arranged on the four corners of the frame 114 of the bottom shell 11, and the other two anti-drop protrusions 118 are respectively arranged at the middle parts of the left side of the right side of the frame 114 of the bottom shell 11. The fixing pieces 112 and the positioning grooves 113 are arranged on the inner side surfaces of the anti-drop protrusions 118, so that drop resistance is integrated with fixing and positioning, which is convenient to simplify the structure.

The method of using the integrated structure of shell and film of this embodiment is:

1. Install the mobile phone 14 in the bottom shell 11, and fix the mobile phone 14 with the fixing piece 112 on the frame 114 of the bottom shell 11;

2. Use the second positioning structure to install the upper cover 12 on the bottom shell 11;

3. Exhaust air from the second positioning structure in one end of the bottom shell 11 as a starting point, attach the panel to the mobile phone screen, and use the suction between the panel and the mobile phone screen to realize the fixation of the upper cover 12.

Embodiment 3

With reference to FIGS. 29-40, this embodiment also provides an integrated structure of shell and film with seven buckling positions and middle positioning, including a bottom shell 31 and an upper cover 32, the bottom shell 31 is provided with a mobile phone accommodating cavity 311, and the upper cover 32 is buckled with the bottom shell 31 to wrap the mobile phone accommodating cavity 311, and the bottom shell 31 is provided with a fixing structure, the fixing structure includes a fixing piece 312, the upper cover is provided with an avoiding position 321 that cooperates with the fixing piece 312, and the fixing piece 312 cooperates with the avoiding position 321 to form a first positioning structure.

A positioning groove 313 is arranged on the bottom shell 31, a positioning protrusion 322 cooperating with the positioning groove 313 is arranged on the upper cover 32, and the positioning protrusion 322 is installed in the positioning groove 313 to form a second positioning structure. In this embodiment, the bottom shell 31 and the upper cover 32 can fully cover the mobile phone and realize all-inclusive protection of the mobile phone 34. Secondly, a fixing structure is arranged on the bottom shell 31, which can fix the mobile phone, so that the bottom shell 31 can be used alone as a mobile phone shell, which is more portable. In addition, by arranging the second positioning structure on the bottom shell 31, it is convenient to install the upper cover 32.

The bottom shell 31 includes a frame 314 of bottom shell 31 and a bottom plate 315, the upper cover 32 includes a frame 323 of the upper cover 32 and a panel 324, the bottom plate 315 is installed on the frame 314 of the bottom shell 31, and the panel 324 is installed on the frame 323 of the upper cover 32.

The frame 314 of the bottom shell 31 and the frame 323 of the upper cover 32 are provided with a circle of L-shaped installation grooves 33, the bottom plate 315 is arranged in the L-shaped installation groove 33 of the frame 314 of the bottom shell 31, and the bottom plate 315 is flush with the L-shaped installation groove 33 of the frame 314 of the bottom shell 31; the panel 324 is arranged in the L-shaped installation groove 33 of the frame 323 of the upper cover 32, and the panel 324 is flush with the L-shaped installation groove 33 of the frame 323 of the upper cover 32. In this embodiment, the panel 324 can use tempered glass as the mobile phone film, and the tempered glass is flush with the L-shaped installation groove 33 of the frame 323 of the upper cover 32. During use, it is convenient to exhaust air between the panel 324 and the mobile phone screen to realize the tightness between the panel 324 and the mobile phone screen, and it is convenient for users to operate the mobile phone screen, optimizing the bare-metal sense of the mobile phone 34, and effectively improving the user experience.

The frame 314 of the bottom shell 31 and the frame 323 of the upper cover 32 are seamlessly butted on the side of the mobile phone accommodating cavity 311, and the boundary line between the bottom shell 31 and the upper cover 32 can be arranged on the side edge of the mobile phone 34. When the upper cover 32 is not tightly attached to the mobile phone screen to generate bubbles, it is easy to open the upper cover 32 for exhaust.

In this embodiment, there are seven fixing pieces 312 and seven avoiding positions 321, the positions of six fixing pieces 312 and the avoiding position 321 are the same as the positions in the embodiment 2, and the structure refers to the figures of the embodiment 1 and the embodiment 2. The last one fixing piece is arranged at the middle part of the one end of the frame 314 of the bottom shell 31, and the last one avoiding position is arranged at the middle part of the one end of the frame 323 of the upper cover 32.

Figure 33:
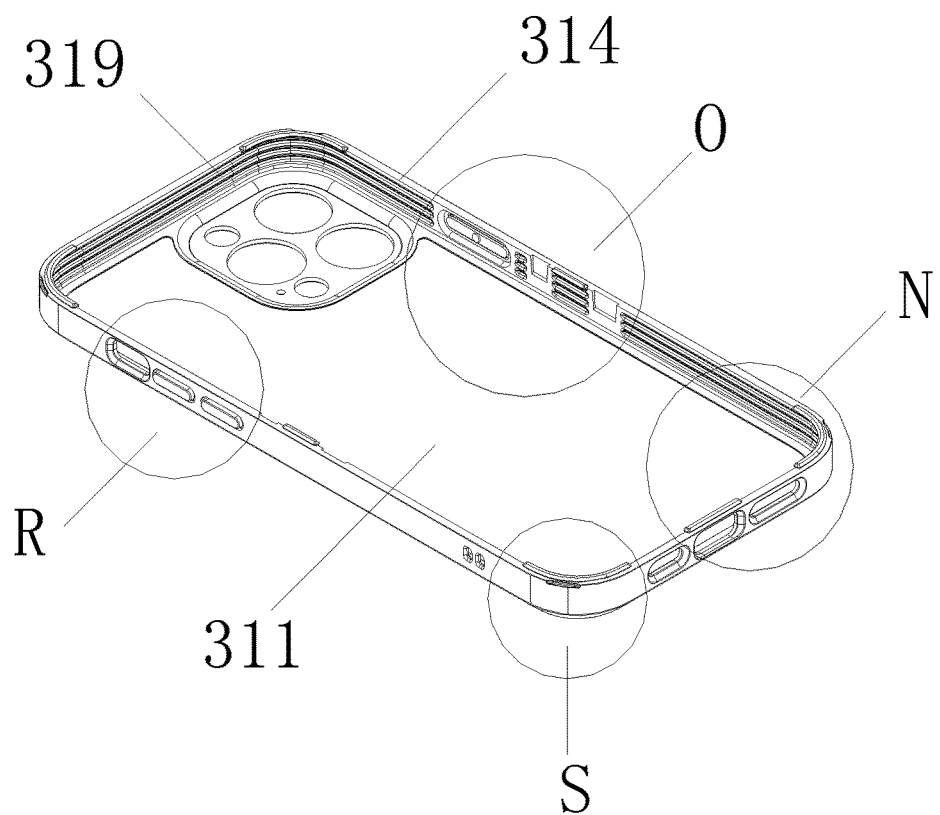
FIG. 33 is an axonometric drawing of a frame of the bottom shell in the embodiment 3.
Figure 34:
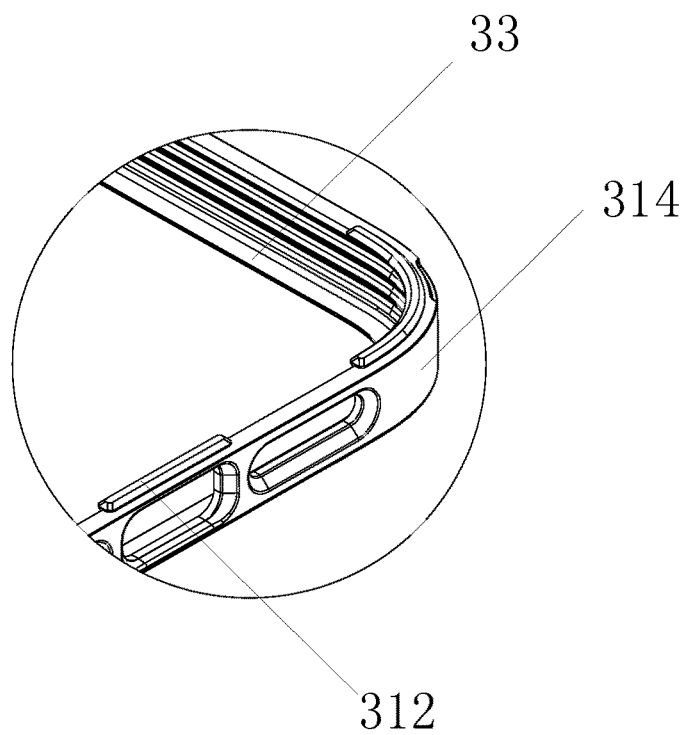
FIG. 34 is a partial enlarged view of N in FIG. 33.
Figure 35:
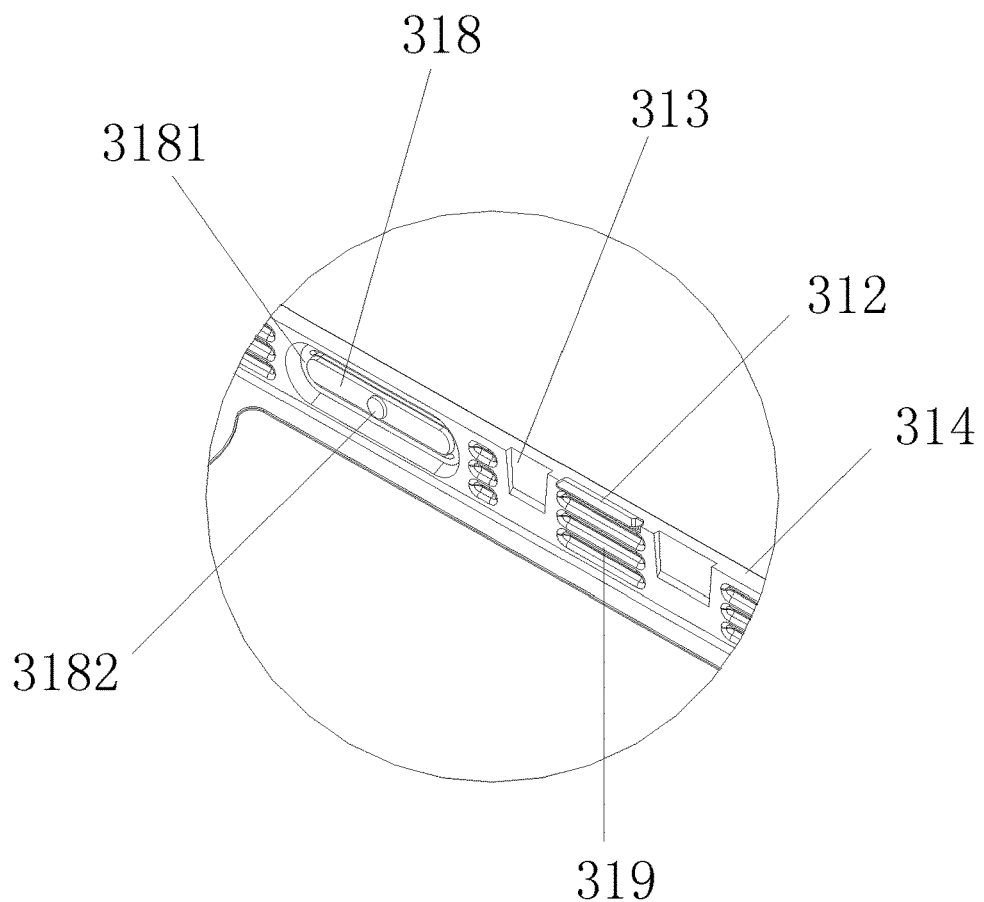
FIG. 35 is a partial enlarged view of O in FIG. 33.
Figure 36:
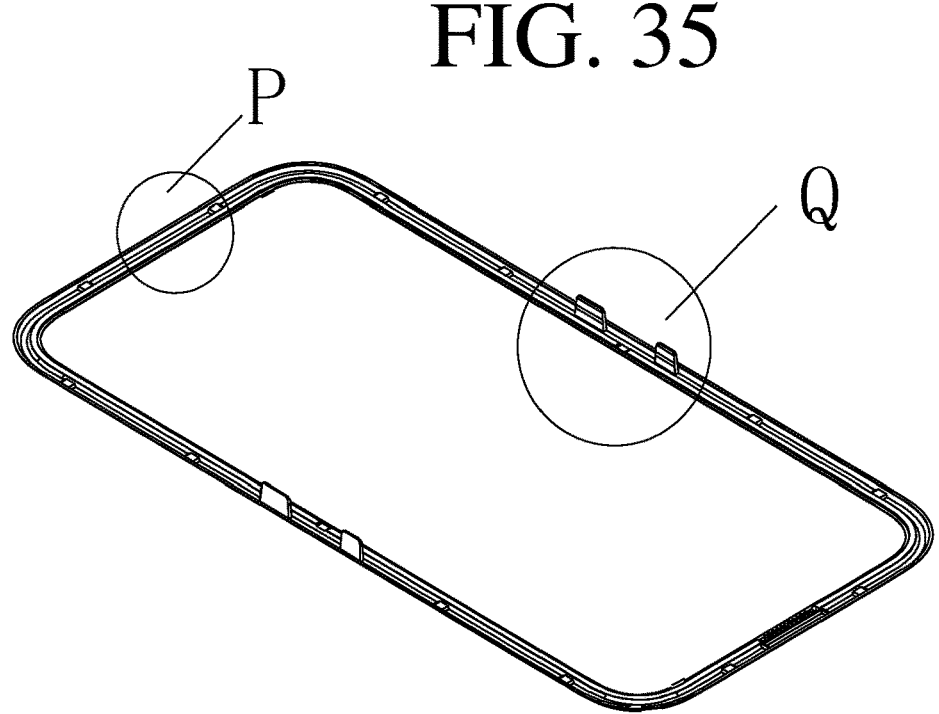
FIG. 36 is an axonometric drawing of a frame of the upper cover in the embodiment 3.
Figure 37:
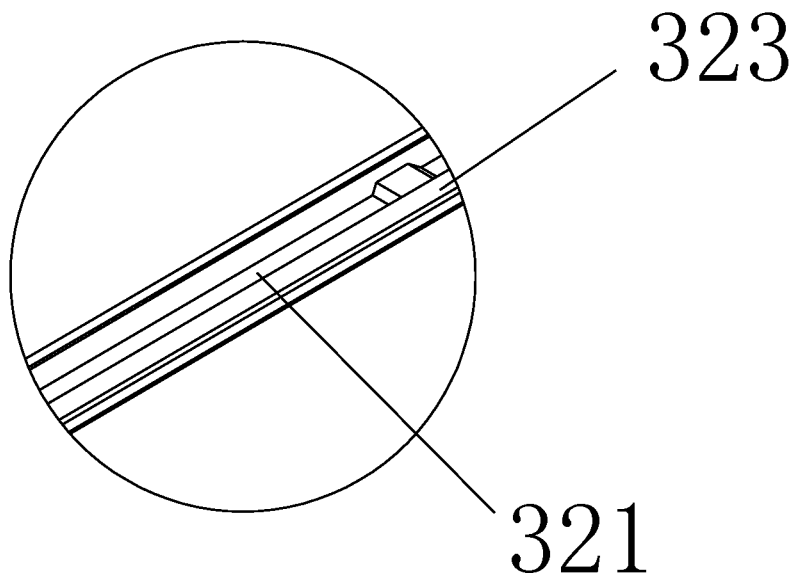
FIG. 37 is a partial enlarged view of P in FIG. 36.
Figure 38:
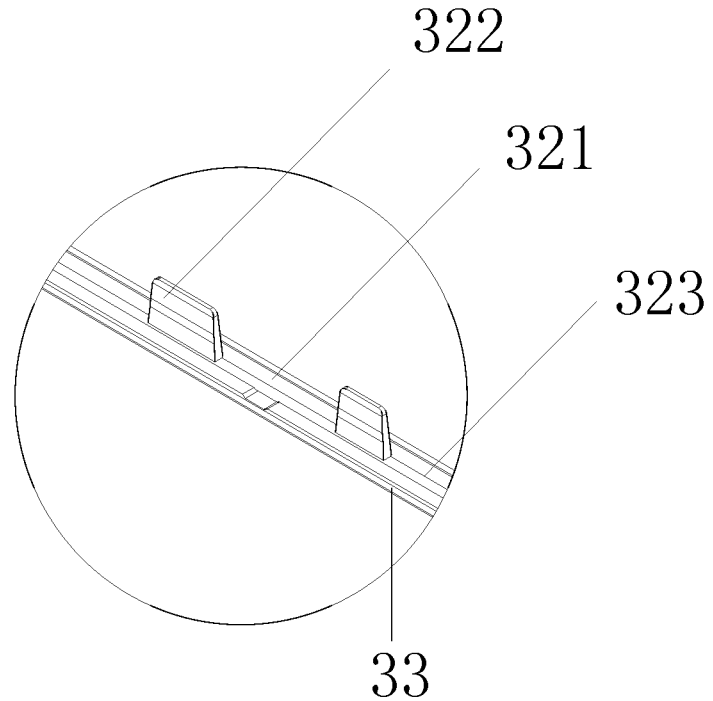
FIG. 38 is a partial enlarged view of Q in FIG. 36.
Figure 39:
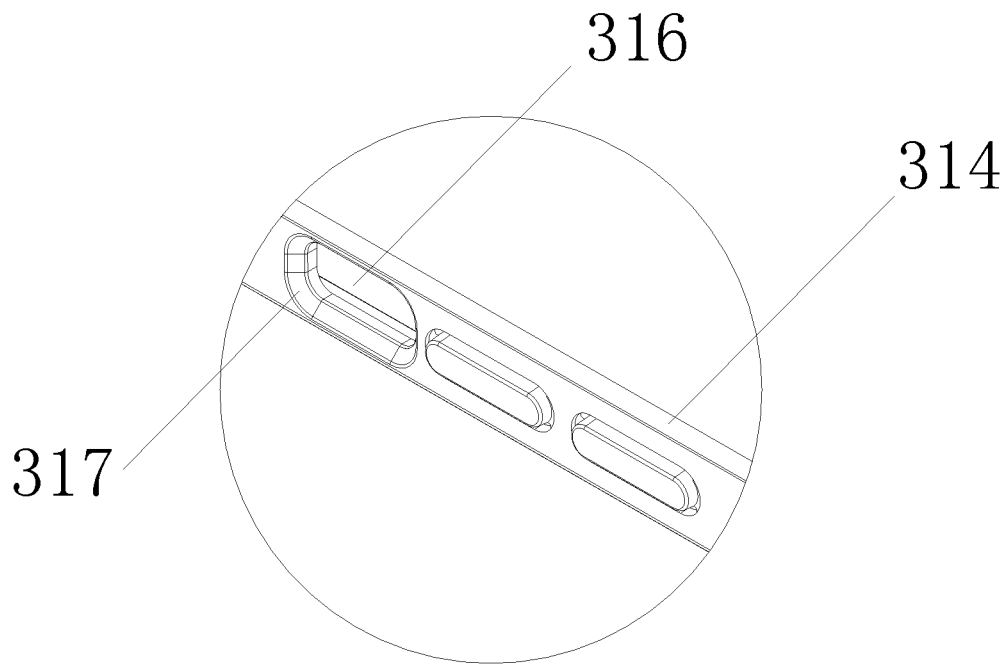
FIG. 39 is a partial enlarged view of R in FIG. 36.
Figure 40:
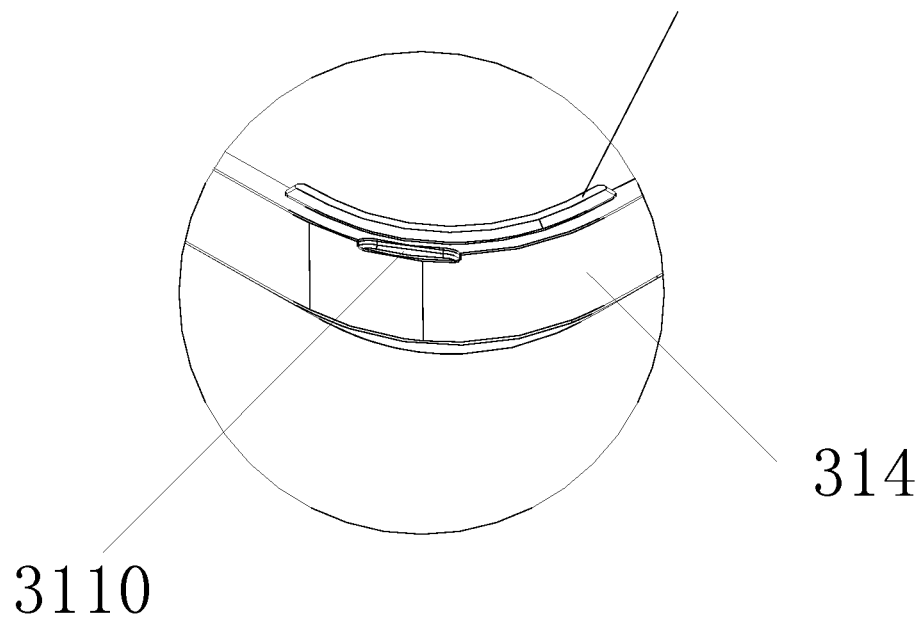
FIG. 40 is a partial enlarged view of S in FIG. 36.

Referring to FIGS. 33-40, when in product assembly, the fixing piece 312 in a partial enlarged view of N in FIG. 33 corresponds to the avoiding position 321 in a partial enlarged view of P in FIG. 36. The fixing piece 312 in a partial enlarged view of O in FIG. 33 corresponds to the avoiding position 321 in a partial enlarged view of Q in FIG. 36.

In this embodiment, there are four positioning grooves 313 and four positioning protrusions 322, the positions of which are the same as the positions in the embodiment 2.

In this embodiment, the frame 314 of the bottom shell 31 is also provided with a button installation groove 316, and a ramp-shaped structure 317 is arranged around the button installation groove 316. In the present invention, the ramp-shaped structure 317 can facilitate the protruding of the buttons and the pressing of the buttons.

In this embodiment, the frame 314 of the bottom shell 31 is also provided with movable buttons 318, the upper and lower sides of the movable buttons 318 are provided with button connectors 3181, and the movable buttons 318 are connected to the frame 314 of the bottom shell 31 through the button connectors 3181; and the inner sides of the movable buttons are also provided with button protrusions 3182. In the present invention, by arranging the movable buttons 318, the buttons will not be fixed on the bottom shell 31, which facilitates the pressing of the buttons. The button protrusions 3182 can be supported on the buttons of the mobile phone, and the pressing is more labor-saving.

In this embodiment, the inner side of the frame 314 of the bottom shell 31 is also provided with anti-slip stripes 319, which can prevent slipping of the mobile phone 34.

In this embodiment, the outer side of one fixing piece 312 arranged on the bottom corner of the frame 314 of the bottom shell 31 is also provided with a notch groove 3110, and the notch groove 3110 forms a disassembling position. The disassembling position can facilitate the disassembling of the upper cover; and the fixing piece 312 can realize the integration of a fixing position and the disassembling position, simplify the product structure and improve the user experience.

A method of using the integrated structure of shell and film of this embodiment is:

1. Installing the mobile phone 34 in the bottom shell 31, and fixing the mobile phone 34 with the fixing piece 312 on the frame 314 of the bottom shell 31;

2. Using the second positioning structure to install the upper cover 32 on the bottom shell 31;

3. From the second positioning structure in the middle of the bottom shell 31 as a starting point, exhausting air along the upper and lower sides, attaching the panel to the mobile phone screen, and using the suction between the panel and the mobile phone screen to realize the fixation of the upper cover 32.

The above are only preferred embodiments of the present invention and are not intended to limit the present invention. Any modification, equivalent replacement and improvement made within the spirit and principle of the present invention shall be included in the protection scope of the present invention.

What is claimed is:

1. An integrated structure of shell and film with high compatibility and convenient positioning, comprising a bottom shell and an upper cover, the bottom shell is provided with a mobile phone accommodating cavity, and the upper cover is buckled with the bottom shell to wrap the mobile phone accommodating cavity, characterized in that the bottom shell is provided with a fixing structure for fixing a mobile phone, the fixing structure includes a fixing piece, the upper cover is provided with an avoiding position that cooperates with the fixing piece, and the fixing piece cooperates with the avoiding position to form a first positioning structure;

wherein a positioning groove is provided on the bottom shell, the positioning protrusion cooperating with the positioning groove is provided on the upper cover, and the positioning protrusion is installed in the positioning groove to form a second positioning structure;

the bottom shell further includes a bottom plate, the upper cover further includes a panel, the bottom plate is installed on the frame of the bottom shell, and the panel is installed on the frame of the upper cover;

wherein the bottom shell and the upper cover both include a frame; and the fixing piece continuously or intermittently surrounds the entire peripheral side or part of the peripheral side of the frame of the bottom shell, and the avoiding position continuously or intermittently surrounds the entire peripheral side or part of the peripheral side of the frame of the upper cover.

2. The integrated structure of shell and film with high compatibility and convenient positioning according to claim 1, characterized in that the frame is provided with a circle of L-shaped installation grooves, the bottom plate is arranged in the L-shaped installation groove of the frame of the bottom shell, and the bottom plate is flush with the L-shaped installation groove of the frame of the bottom shell; the panel is arranged in the L-shaped installation groove of the frame of the upper cover, and the panel is flush with the L-shaped installation groove of the frame of the upper cover.

3. The integrated structure of shell and film with high compatibility and convenient positioning according to claim 1, characterized in that there are more than two fixing pieces, and the two or more fixing pieces are symmetrically arranged on the frame of the bottom shell; and there are more than two avoiding positions, and the two or more avoiding positions are symmetrically arranged on the frame of the upper cover.

4. The integrated structure of shell and film with high compatibility and convenient positioning according to claim 3, characterized in that there are four fixing pieces, which are respectively arranged on four corners of the frame of the bottom shell; and there are four avoiding positions, which are respectively arranged on four corners of the frame of the upper cover.

5. The integrated structure of shell and film with high compatibility and convenient positioning according to claim 4, characterized in that the outer side of one fixing piece arranged on the bottom corner of the frame of the bottom shell is also provided with a notch groove, and the notch groove forms a disassembling position.

6. The integrated structure of shell and film with high compatibility and convenient positioning according to claim 3, characterized in that there are six fixing pieces, of which four fixing pieces are respectively arranged on four corners of the frame of the bottom shell, and the other two fixing pieces are respectively arranged at the middle parts of the left side and the right side of the frame of the bottom shell; and there are six avoiding positions, of which four avoiding positions are respectively arranged on four corners of the frame of the upper cover, and the other two avoiding positions are respectively arranged at the middle parts of the left side and the right side of the frame of the upper cover.

7. The integrated structure of shell and film with high compatibility and convenient positioning according to claim 6, characterized in that there are more than two positioning grooves, and the two or more positioning grooves are respectively symmetrically arranged on the left side and the right side of the frame of the bottom shell and are located on the side edges of the fixing pieces; and there are more than two positioning protrusions, and the two or more positioning protrusions are respectively symmetrically arranged on the left side and the right side of the frame of the upper cover and are located on the side edges of avoiding grooves.

8. The integrated structure of shell and film with high compatibility and convenient positioning according to claim 7, characterized in that there are four positioning grooves, which are respectively arranged at the middle parts of the left side of the right side of the frame of the bottom shell and on the two sides of the fixing pieces; and there are four positioning protrusions, which are respectively arranged at the middle parts of the left side of the right side of the frame of the upper cover and on the two sides of the avoiding positions.

9. The integrated structure of shell and film with high compatibility and convenient positioning according to claim 3, characterized in that there are seven fixing pieces, of which four fixing pieces are respectively arranged on four corners of the frame of the bottom shell, the other two fixing pieces are respectively arranged at the middle parts of the left side and the right side of the frame of the bottom shell, and the last one fixing piece is arranged at the middle part of one end of the frame of the bottom shell; and there are seven avoiding positions, of which four avoiding positions are respectively arranged on four corners of the frame of the upper cover, the other two avoiding positions are respectively arranged at the middle parts of the left side and the right side of the frame of the upper cover, and the last one avoiding position is arranged at the middle part of one end of the frame of the upper cover.

10. The integrated structure of shell and film with high compatibility and convenient positioning according to claim 7, characterized in that there are two positioning grooves, which are symmetrically arranged at the left end part and the right end part of the frame of the bottom shell and are located on the side edges of the fixing pieces; and there are two positioning protrusions, which are symmetrically arranged at the left end part and the right end part of the frame of the upper cover and are located on the side edges of the avoiding positions.

11. The integrated structure of shell and film with high compatibility and convenient positioning according to claim 1, characterized in that the fixing piece includes a connecting portion and a fixing portion, the fixing portion and the connecting portion are integrally formed, the fixing portion is fixed to the frame of the bottom shell through the connecting portion, and the fixing portion is perpendicular to the frame of the bottom shell.

12. The integrated structure of shell and film with high compatibility and convenient positioning according to claim 1, characterized in that the positioning groove is arranged on the frame of the bottom shell, and the positioning groove continuously or intermittently surrounds the entire peripheral side or part of the peripheral side of the frame of the bottom shell; and the positioning protrusion continuously or intermittently surrounds the entire peripheral side or part of the peripheral side of the frame of the upper cover.

13. The integrated structure of shell and film with high compatibility and convenient positioning according to claim 1, characterized in that the frame of the bottom shell is further provided with anti-drop protrusions, and there are more than two anti-drop protrusions, and the two or more anti-drop protrusions are symmetrically arranged on the frame of the bottom shell; and the fixing pieces and the positioning grooves are arranged on the inner side surfaces of the anti-drop protrusions.

14. The integrated structure of shell and film with high compatibility and convenient positioning according to claim 1, characterized in that the frame of the bottom shell is further provided with movable buttons, the upper and lower sides of the movable buttons are provided with button connectors, and the movable buttons are connected to the frame of the bottom shell through the button connectors; and the inner sides of the movable buttons are also provided with button protrusions.

15. The integrated structure of shell and film with high compatibility and convenient positioning according to claim 1, characterized in that a button installation groove is further arranged on the frame of the bottom shell, and a ramp-shaped structure is arranged around the button installation groove.

16. The integrated structure of shell and film with high compatibility and convenient positioning according to claim 1, characterized in that the inner side of the frame of the bottom shell is also provided with anti-slip stripes.

\* \* \* \* \*